(12) United States Patent
Thomas

(10) Patent No.: US 8,671,640 B1
(45) Date of Patent: Mar. 18, 2014

(54) RAPIDLY LOCKING BUILDING/LOCK COMPONENTS, BRIDGE KEYS AND LOCKING KEYS TO CONSTRUCT UNIFORM WHOLE LOCKED BUILDING MEMBERS AND ENTIRE LOCKED STRUCTURES ON-THE-FLY

(76) Inventor: Keith E. Thomas, Columbus, MS (US)

( * ) Notice: Subject to any disclaimer, the term of this patent is extended or adjusted under 35 U.S.C. 154(b) by 245 days.

(21) Appl. No.: 12/928,799

(22) Filed: Dec. 20, 2010

(51) Int. Cl.
*E04B 5/48* (2006.01)
*E04B 2/00* (2006.01)
*E04B 5/04* (2006.01)
*E04C 2/04* (2006.01)
*A63H 33/12* (2006.01)

(52) U.S. Cl.
USPC ............. 52/586.2; 52/503; 52/585.1; 52/605; 52/607; 446/122

(58) Field of Classification Search
USPC ............. 52/503, 504, 505, 596, 582.1, 586.1, 52/586.2, 585.1, 604, 605, 606, 607; 446/122, 123, 124, 85
See application file for complete search history.

(56) References Cited

U.S. PATENT DOCUMENTS

| | | | | |
|---|---|---|---|---|
| 840,071 | A * | 1/1907 | Lewis | 52/568 |
| 1,894,605 | A * | 1/1933 | Wright | 446/122 |
| 2,134,637 | A * | 10/1938 | Loucks | 52/503 |
| 2,185,196 | A * | 1/1940 | Heath | 52/428 |
| 2,861,388 | A * | 11/1958 | Favaretto | 446/124 |
| 3,609,926 | A * | 10/1971 | Muse | 52/439 |
| 4,299,067 | A * | 11/1981 | Bertschi | 52/127.12 |
| 4,833,856 | A * | 5/1989 | Zwagerman | 52/592.1 |
| 4,896,999 | A * | 1/1990 | Ruckstuhl | 405/286 |
| 5,103,616 | A * | 4/1992 | Nordberg | 52/585.1 |
| 5,152,530 | A * | 10/1992 | Dodek, II | 273/156 |
| 5,826,394 | A * | 10/1998 | Barton et al. | 52/592.1 |
| 5,921,046 | A * | 7/1999 | Hammond, Jr. | 52/564 |
| 5,924,906 | A * | 7/1999 | Grafton | 446/121 |
| 6,000,186 | A * | 12/1999 | Fielding et al. | 52/564 |
| 6,450,853 | B1 * | 9/2002 | Larws | 446/93 |
| 6,711,865 | B2 * | 3/2004 | Chaudoreille | 52/603 |
| 7,429,144 | B1 * | 9/2008 | Lai | 404/40 |
| 7,736,211 | B2 * | 6/2010 | Marzetta | 446/122 |
| 8,079,195 | B2 * | 12/2011 | Cables | 52/572 |
| 8,105,127 | B2 * | 1/2012 | Heston | 446/85 |
| 8,266,855 | B1 * | 9/2012 | Altararwah | 52/284 |
| 8,366,507 | B2 * | 2/2013 | Chen | 446/108 |
| 8,402,710 | B2 * | 3/2013 | Cables | 52/604 |
| 2003/0203702 | A1 * | 10/2003 | Germerodt et al. | 446/85 |
| 2003/0208981 | A1 * | 11/2003 | Price et al. | 52/596 |
| 2007/0175158 | A1 * | 8/2007 | Cope et al. | 52/585.1 |
| 2009/0239441 | A1 * | 9/2009 | Hu | 446/123 |
| 2010/0095631 | A1 * | 4/2010 | Cables | 52/604 |

* cited by examiner

*Primary Examiner* — Ryan Kwiecinski

(57) ABSTRACT

A plurality of adjacent, aligned, shaped hollow uniform building components, each having four separate distinct key channels are assembled together with a plurality of friction fitting locking keys to accomplish at least three separate distinct locks which become uniform whole friction fitting structural buildings upon alignment of like side surfaces or like end surfaces of uniform building components, together with friction fitting insertion and alignment of one of four separate and distinct shaped uniform bridge keys, then friction fit insertion of the primary locking keys into and through the primary key channels of adjacent and/or abutting uniform building components and uniform bridge keys, thereby rapidly achieving the primary lock and key joint, being the primary finished bonded joint and the primary lock of this invention. The second and third separate distinct locks of this invention are accomplished using corner locking keys to achieve the corner lock and/or center bore hole locking keys to achieve the center bore hole lock. The interior or exterior of a friction fitting structural building is enhanced with other components, including transverse locking keys to form a transverse lock, and key channels may also contain building improvement components.

10 Claims, 23 Drawing Sheets

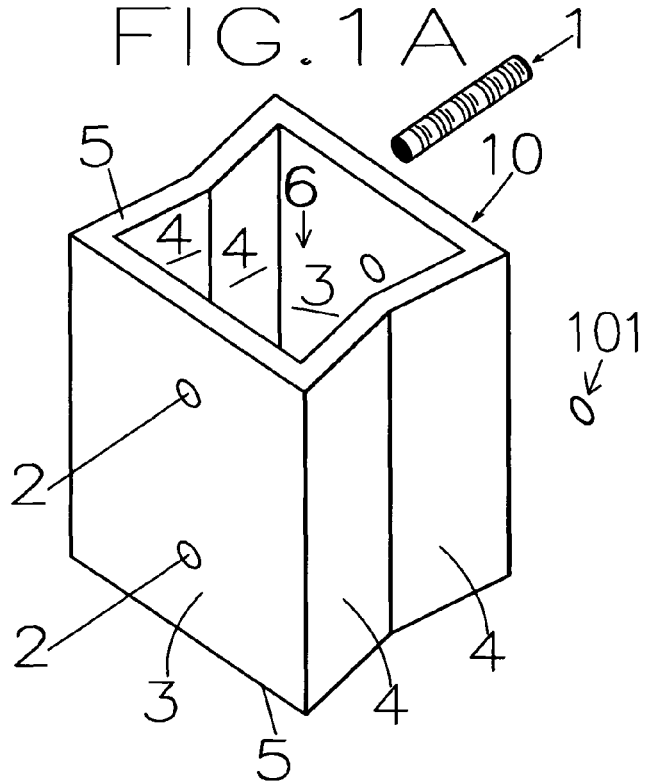
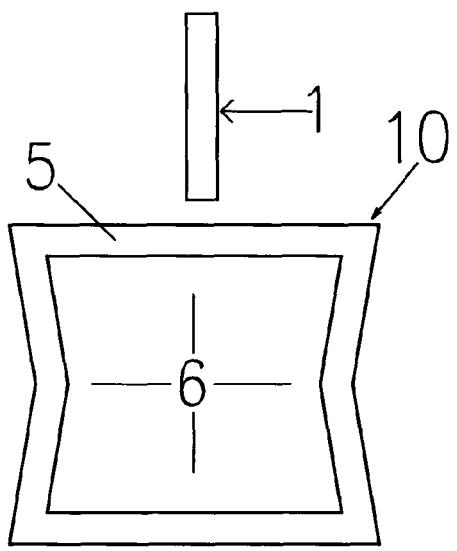
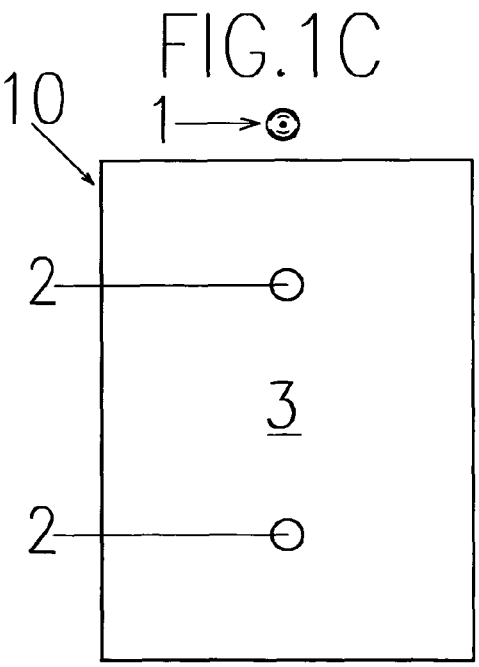

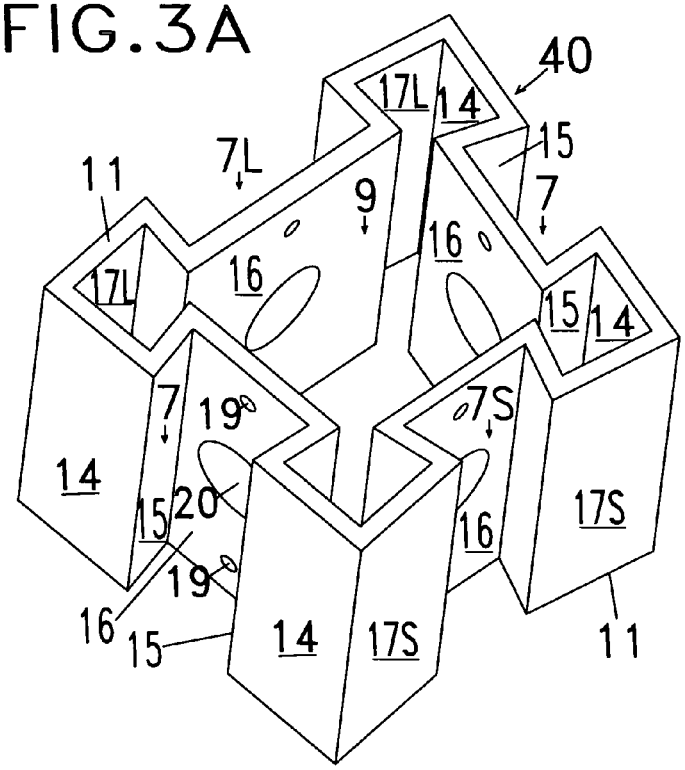
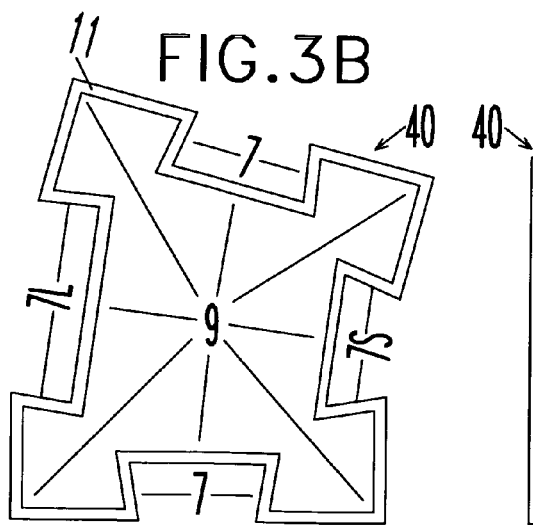
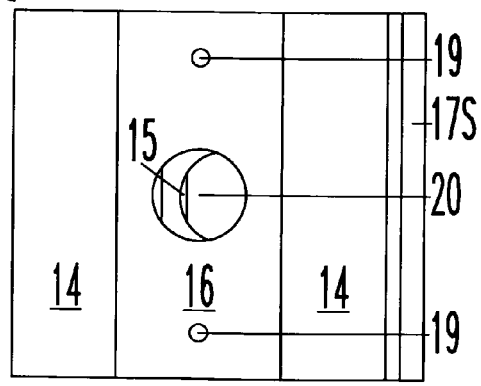

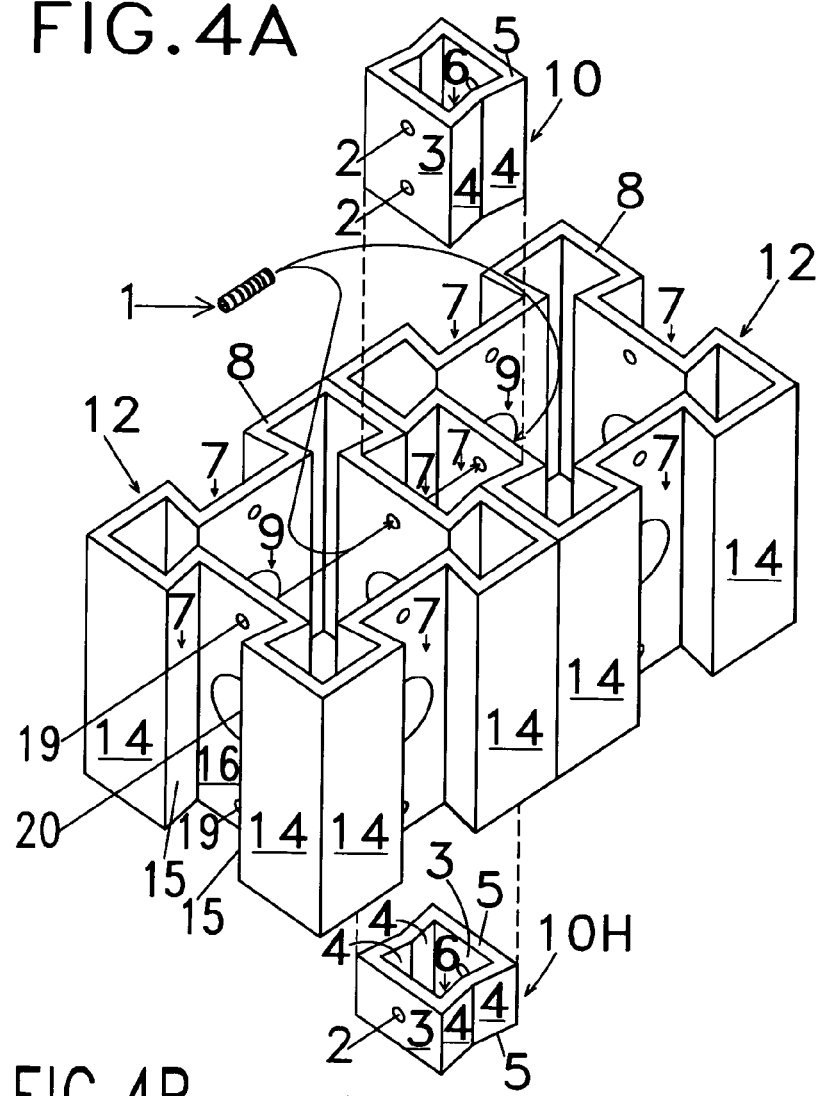
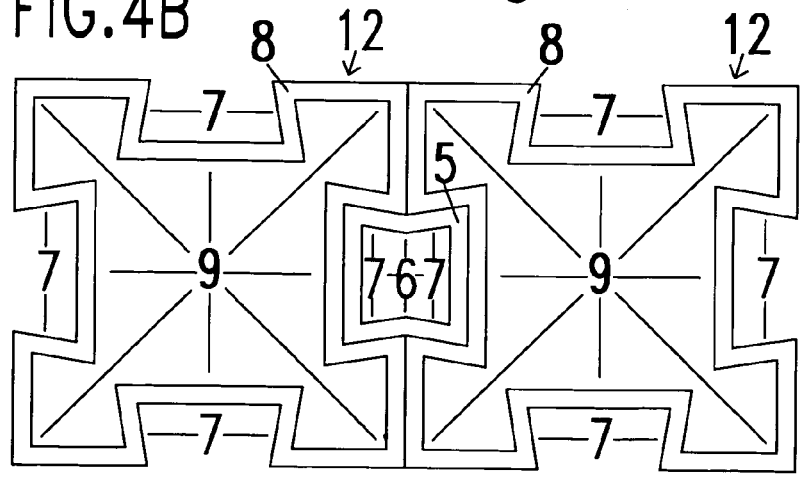

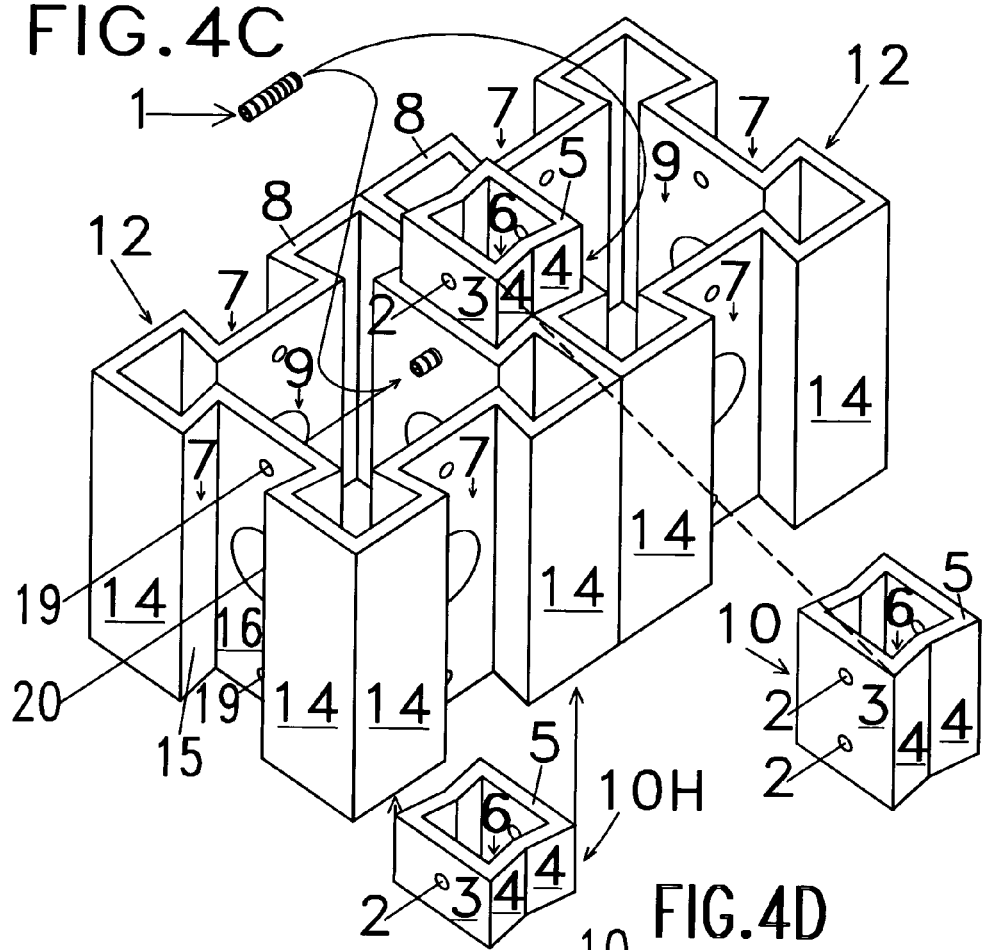
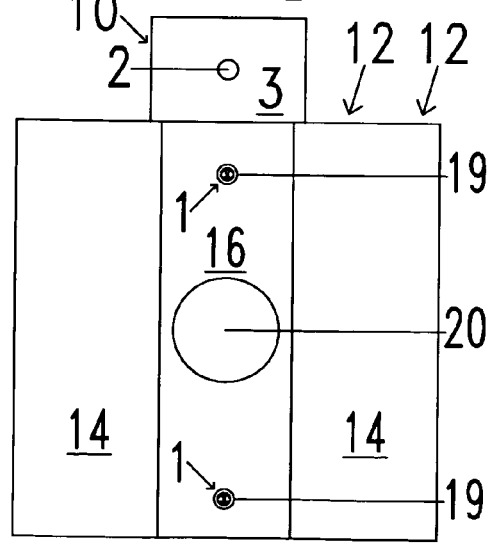

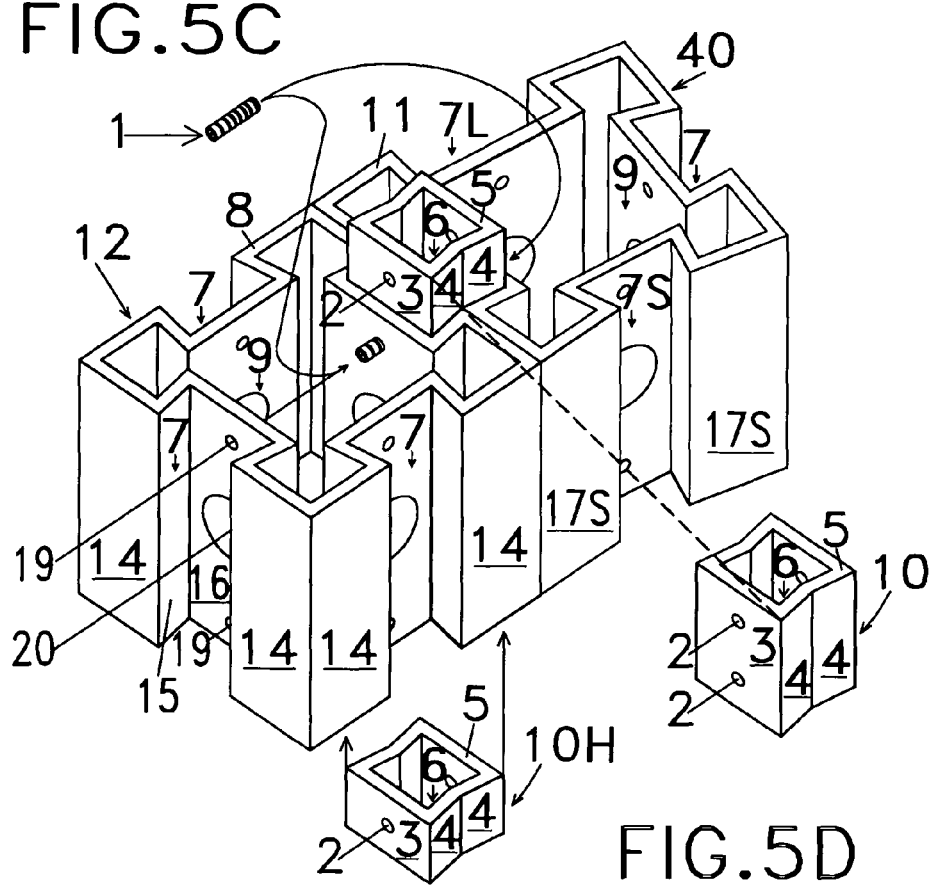
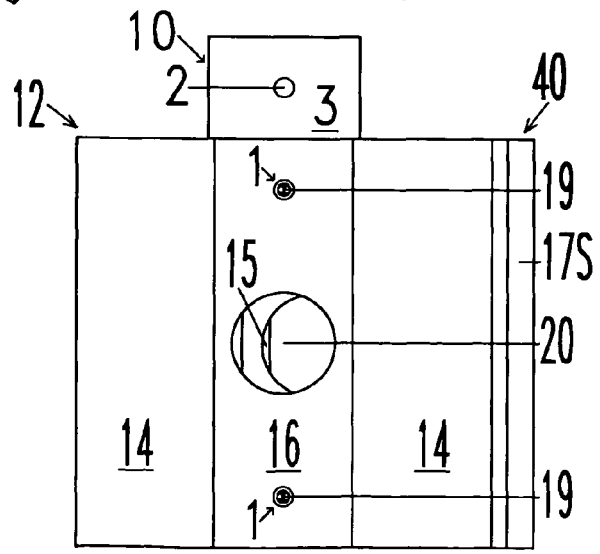

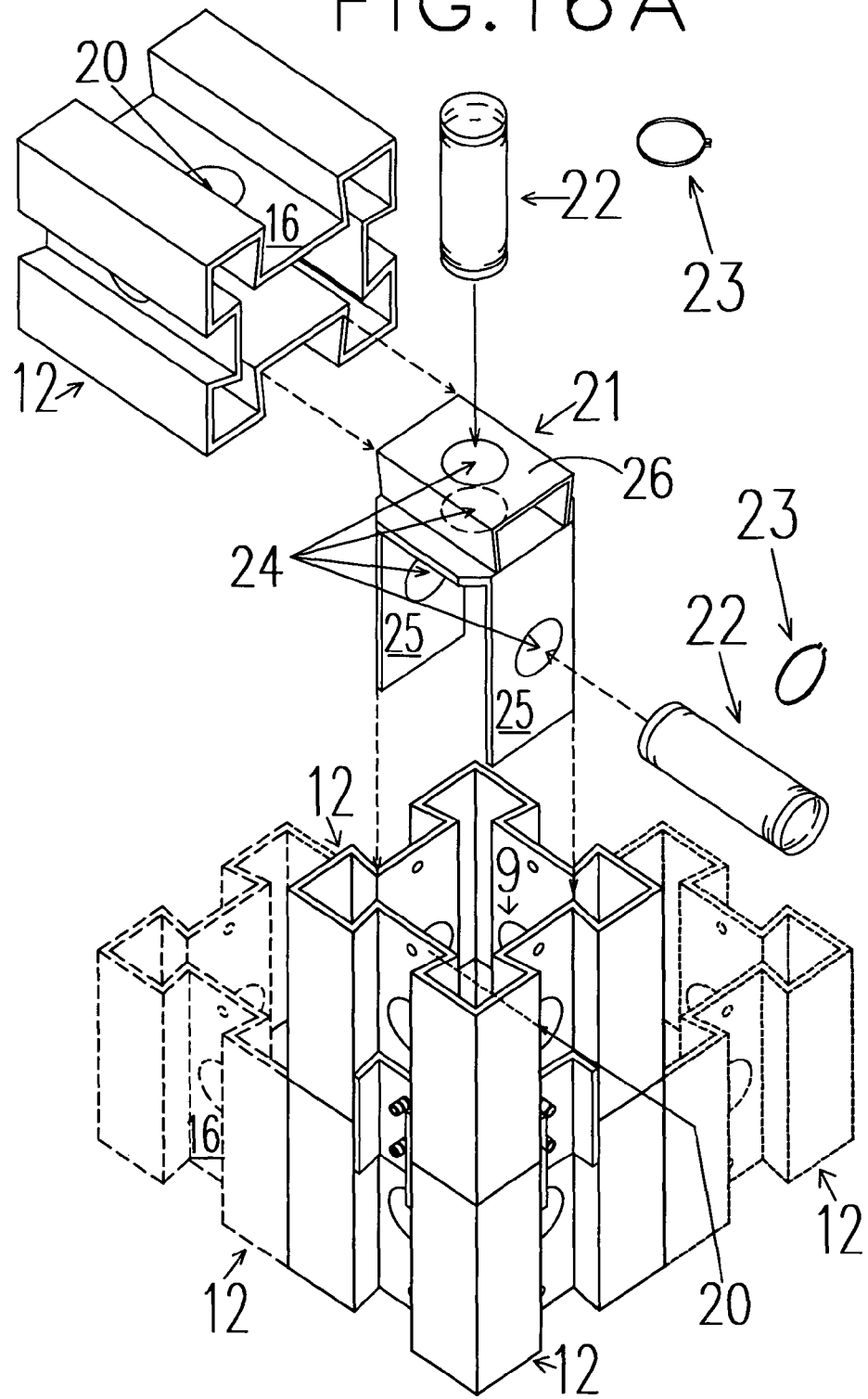

RAPIDLY LOCKING BUILDING/LOCK COMPONENTS, BRIDGE KEYS AND LOCKING KEYS TO CONSTRUCT UNIFORM WHOLE LOCKED BUILDING MEMBERS AND ENTIRE LOCKED STRUCTURES ON-THE-FLY

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

The present invention discloses a novel method of structural building which is rapidly locked, being a uniform whole able to sustain itself independent of other materials and processes immediately upon the insertion of the primary locking keys resulting in the primary lock and keys finished joint, being the primary lock of the structure. The primary objects of the instant invention and the useful purposes and advantages of the invention are achieved by using pre-configured manufactured cube and arc shaped hollow uniform building components each having four separate and distinct key channels for the purpose of receiving four separate and distinct keys to accomplish three distinct locks. The cube shaped building components may be used to accomplish a fourth lock. The first lock of the invention, being the primary lock of the structure is accomplished using a single uniform bridge key, being one of four separate and distinct shaped uniform bridge keys combined with primary locking keys being inserted perpendicular to the bridge key channels of both building components and the corresponding uniform bridge key side surfaces simultaneously and penetrating their external and internal cavities through the primary key channel. Only three separate distinct uniform components are required to accomplish the primary lock of the invention and a fourth component may be used at the option of the builder to restrain the movement of the primary locking keys after the primary lock is finished. A first additional locking key component rapidly deployed on-the-fly, being the corner locking key, accomplishes the corner lock of the invention, being an additional complimentary reinforcement lock within the entire structure when combined with any other lock of the invention. A second additional locking key component rapidly deployed on-the-fly, being the center bore hole locking key, accomplishes the center bore hole lock of the invention, being an additional complimentary reinforcement lock within the entire structure when combined with any other lock of the invention; These two additional locks of the invention are complimentary locks within the structure which may be used at the discretion of the builder. A third additional locking key component rapidly deployed on-the-fly, being the uniform transverse bridge key, together with building/lock components and pairs of center bore hole locking keys accomplishes the transverse lock of the invention, being an additional lock providing the advantage of locking cube shaped building components transverse to each other thereby changing the orientation of any locked structure and may be used at the discretion of the builder. Any number of additional components may be used at the option of the builder to restrain the movement of the primary locking keys or center bore hole locking keys after completion of any primary lock, center bore hole lock, or transverse lock. Any friction fitting locking key may be threaded or otherwise modified to correspond with any design of locking key restraint used as long as it retains it's friction fitting function. Every component of the structure performs a locking function and is a building component. All of the components are rapidly locked within a few minutes and may be reused, providing costs savings for materials and labor as well as more uniform strength and other advantages.

2. Description of the Prior Art

Heretofore known methods for constructing structural buildings using adjacent dovetail shaped corresponding key ways or similar corresponding key ways to bond adjacent components with corresponding shaped connecting elements or keys contained within their respective key ways have deployed various novel methods and processes to accomplish their respective primary means of bonding components with finished joints, resulting in finished structural buildings varying in strength and quality of construction, time elapsed to complete construction, costs of materials, and other advantages provided by each distinct and novel method. A first such prior-art method has been used for constructing pre cast concrete walls. The pre cast walls have key ways that have adjacent faces against each other. Keys are first placed in a friction fit into the adjacent key ways and a special tool is used to wedge them into place. In the next step reinforcement rods are inserted through the respective wedged keys. Then grout is mixed with the necessary ingredients. The walls are then braced prior to pouring grout. The grout is then poured and a significant amount of time is required for the grout to set up finishing the completed bonded joint. Four separate and distinct components are needed, being pre cast walls, metal keys, re-rod, and grout to accomplish the finished joint; And, in order to accomplish the finished joint an additional labor operation of bracing the walls prior to pouring the grout is required. Once bonded the concrete walls allow no access for internal and external plumbing, wiring, mechanical, electrical, or other improvement devices or materials after the structure is erected. Demolition of existing walls is required to make design changes to exiting walls. No method of rapidly changing the length, height, and depth of the walls is disclosed. No method for joining walls on top of walls mounted transverse to each other is disclosed. Building components used to construct grouted and poured concrete walls are not reusable and are not removable without destruction of existing walls. The foundation is separate from pre cast concrete walls resting on them. Pre cast concrete grout poured and bonded joints are a single finished bonded connecting element between two pre-cast wall components. Pre cast concrete walls single bonded joints incorporate their reinforcement into each single bonded joint which joint is confined within the external key ways of the adjoining building components and do not penetrate through and into the internal central cavities of the building components on the opposite side of the walls of their dovetailed shaped key ways. And, there is no connecting element disclosed that allows for rapidly locking the next tier of components with the tier beneath it using only single uniform connecting elements.

A second prior-art method employs a structural frame system consisting of rails or rail-elements and post or post-elements connected together with releasable double couplers to form a structure. This second prior-art method also employs friction fitting keys like the above mentioned first prior art method and it's method of obtaining a primary bond finished joint requires less time to accomplish. Four separate and distinct components are needed to accomplish the finished joint. At least three separate distinct components are required to construct the coupler devise, one being the corresponding keys, a second is the center plate, and thirdly screws to assemble the coupler. The rails and coupler device being a total of at least four separate distinct components to form the bonded joint have a single connecting element assembled with screws which constrains the bonded components primarily against lateral separation and this lateral constraint is dependent upon the strength of the screws at the center of the coupler device, which do not engage within the internal cavities of the rails on the opposite side of the walls of their key ways. Stated another way, the primary finished bonded joint is isolated within the respective adjacent key ways of the joined rails and do not provide a perpendicular locking mechanism which penetrates through the interior and exterior walls of all components of the bond confining the components from lateral and vertical separation simultaneously. Only one connecting element is disclosed. The coupler device is not a separate distinct uniform component and requires time for assembly before use and once assembled is only capable of interlocking with two components per connecting element for each bonded finished joint, thus the name coupler device. There is no device disclosed for locking three or four components into a single primary finished bonded joint with a single uniform connecting element. And, there is no connecting element disclosed that allows for rapidly locking the next tier of components with the tier beneath it using only single uniform connecting elements.

A third prior art method employs a constructional toy including a plurality of main building blocks, preferably square and triangular in shape, all having identical grooves in their side faces, the mouth of each groove being narrower than the rest of the groove. This prior-art discloses a method for constructing toys that connect in a wide variety of ways using a star friction fitting methodology which does use friction fitting connectors to connect hollow components together within mutually aligned corresponding grooves on the exterior side faces of the building components. The connectors slide in and out of the channels easily and are made of plastic which is slightly flexible and crushable so young children may easily construct toys; However, the method used in this invention has no means of immobilizing the sliding parts. The disclosed method of this third prior-art deploys a variety of connecting element embodiments none of which involve using a combination of the interior cavities of the building components and interior cavities of the connecting elements as lock components to create uniform whole locked structures, which use two keys to achieve a perpendicular lock composed of these two separate and distinct complimentary locking keys at right angles to each other deployed simultaneously to achieve a single primary lock, constraining the locked components against lateral and vertical separation simultaneously and capable of receiving two additional complimentary locking keys surrounding and bisecting the primary lock or locks, deployed exclusively within the respective interior cavities of adjacent components which may be deployed structure wide at the option of the builder. This prior art method uses no lock or locks or any means to eliminate the sliding of components, in fact the point is for them to easily slide, be slightly flexible, crushable, and easily detachable.

SUMMARY OF THE INVENTION

It is the main object of this invention to place and hold by hand two twenty sided cube shaped hollow uniform building components, adjacent and opposed in mirror image to each other, flush, in like side surface to like side surface orientation and/or abutting and opposed in mirror image to each other, flush, stacked on top of each other in like end surface to like end surface orientation and to insert friction fitted by hand without the need for tools each single shaped uniform bridge key, being one of four separate and distinct shaped uniform bridge keys and to rapidly accomplish a uniformly strong friction fitted primary lock engagement of the combined building components and uniform bridge key components by friction fitting on-the-fly within a few minutes primary locking keys, whereby immediately upon friction fitted insertion of primary locking keys the combined locked components are a friction fitted locked structure able to sustain itself independent of other materials or processes, being a uniform whole; And, using this fast, easy, and clean method for producing multi-lateral and/or multi-tier locked uniform building members or entire monolithic structural buildings which are not subject to separation unless unlocked and removed, wherein each twenty sided cube shaped hollow uniform building component remains strongly locked side-to-side and/or end-to-end to its adjacent and/or abutting component(s), and wherein uniform bridge keys thereof fill the interior volumes of their primary lock and keys joints and lock the respective adjacent and/or vertically aligned recessed surfaces, being the bridge key channels of said twenty sided cube shaped hollow uniform building components; And, each primary lock and keys joint has a width and shape substantially corresponding to the width and shape of its corresponding bridge key and primary locking keys wherein the bridge key and primary locking keys serves as the primary bond within its joint. The locking of components described above to accomplish a uniformly strong friction fitted primary lock and keys joint is further described as the primary lock, whereby the cube shaped lock components, bridge keys, and primary locking keys are an integral functional part of the lock itself and are structural building components simultaneously. The methods of locking components disclosed herein as the primary object of this invention are accomplished using a single uniform building component of pre-configured dimensions and features, being a manufactured cube configured to lock together with other substantially identical cubes in two distinct primary lock orientations and two combinations thereof, being a total of four primary lock orientations as follows: (1) adjacent and opposed in mirror image to each other, flush, in like side surface to like side surface orientation is the alignment of two components to achieve a primary lock with each uniform horizontal half bridge key and primary locking keys obtaining a locked flush beam building member, being a uniform whole able to sustain itself independent of other materials or processes. Separate reinforcement materials are not needed to achieve this finished joint and no bracing or additional materials or processes are needed. (2) abutting and opposed in mirror image to each other, flush, stacked on top of each other in like end surface to like end surface orientation is the alignment of two components to achieve a primary lock with each uniform vertical half bridge key and primary locking keys obtaining a locked flush post building member, being a uniform whole able to sustain itself independent of other materials or processes. Separate reinforcement materials are not needed to achieve this finished joint and no bracing or additional materials or processes are needed. (3) adjacent and opposed in mirror image to each other, flush, in like side surface to like side surface orientation; and, abutting and opposed in mirror image to each other, flush, stacked on top of each other in like end surface to like end surface orientation are combined to achieve a primary lock of three components locked with a uniform three quarters bridge key and primary locking keys obtaining a locked flush interior corner frame building member, being a uniform whole able to sustain itself independent of other materials or processes. Separate reinforcement materials are not needed to achieve this finished joint and no bracing or additional materials or processes are needed. (4) adjacent and opposed in mirror image to each other, flush, in like side surface to like side surface orientation; and, abutting and opposed in mirror image to each other, flush, stacked on top of each other in like end surface to like end surface orientation are combined to achieve a primary lock of four components locked with a uniform whole bridge key and primary locking keys obtaining a locked wall building member, being a uniform whole able to sustain itself independent of other materials or processes. Separate reinforcement materials are not needed to achieve this finished joint and no bracing or additional materials or processes are needed; And, the protruding top one-half portion of the whole bridge key is exposed above the surfaces of the components to accept additional components in the next tier. Using like end surface to like end surface alignment orientation in the case of a locked flush post or combining like end surface to like end surface alignment with like side surface to like side surface orientation in the case of a locked interior frame corner or a locked wall, each consecutive tier of end-to-end locked components require protruding bridge keys to accomplish the primary locks. The cube shaped components share bridge keys with the substantially identical cube shaped components beneath them and beside them in the stack and are rapidly friction fitted within a few minutes on-the-fly by the builder to continue another tier of the structure. For instance, in the case of wall construction, four components share a primary lock bonded joint with a single uniform whole bridge key and primary locking keys and this is repeated throughout the wall, having the advantage of rapidly stacking and locking the next pair of components. Using these methods that do not require separate reinforcement materials or additional materials or processes increase the speed of building and reduce the costs of materials and labor. Fewer components also reduce manufacturing materials and labor costs.

It is another main objective of the invention to use a twenty sided arc shaped hollow uniform building component that is offset at an angle fifteen (15) degrees from any twenty sided cube shaped hollow uniform building component when locked to it. These twenty sided arcuate shaped hollow uniform building components that describe an arc of fifteen degrees have most of the locking characteristics of the twenty sided cube shaped hollow uniform building components and function in identical fashion except they have only two like side surfaces with recessed bridge key channels capable of locking with any of the substantially identical four like side surfaces with recessed bridge key channels of the twenty sided cube shaped hollow uniform building component and the incremental measurement of the surfaces of both components must be for all intents and purposes identical to lock and maintain a corresponding height and width increment, being the adjacent and opposed in mirror image to each other, flush, in like side surface to like side surface orientation. The twenty sided arcuate shaped hollow uniform building components that describe an arc of fifteen degrees may lock with themselves exclusively in any identical increment. The twenty sided arcuate shaped hollow uniform building components that describe an arc of fifteen degrees do not correspond in geometric shape and do not align end-to-end with the twenty sided cube shaped hollow uniform building components and are not intended to lock with each other end-to-end and are not intended as a universal measuring device except for measuring degrees of arc. The friction fitting twenty sided arcuate shaped hollow uniform building components that describe an arc of 15 degrees are interchangeable parts and may be rapidly unlocked, removed and reused, being small, lightweight, and easily lifted and transported.

It is another main objective of the invention to use rapid on-the-fly insertion of friction fitted corner locking keys within the hollow interior corner key channels of each twenty sided shaped hollow uniform building component to lock multiple abutting twenty sided shaped hollow uniform building components end-to-end providing a lock on the other side of the wall opposite the dovetail shaped bridge key channels of any primary lock, being the corner lock of the invention and being an additional lock providing vertical locked reinforcement within the entire structure in combination with the primary lock previously described, which may extend the entire height or depth of multiple twenty sided shaped hollow uniform building components locked end-to-end. Corner locking keys are straight pieces of any length. The dovetail shaped recessed bridge key channels of the twenty sided shaped hollow uniform building component are used for a definite purpose throughout the locked structural building as they are channels for bridge keys on the exterior side surface walls to accomplish the primary lock using corresponding bridge keys and primary locking keys and simultaneously establish corner key channels on each of the opposite sides of each dove tail shaped recessed bridge key channel on the interior side surface walls within the corner portions of the centrally located internal cavity of each twenty sided shaped hollow uniform building component or the corner key channels may be separate internal corner cavities of any shape. Stated another way each dovetail shaped bridge key channel may be locked by two separate and distinct locks, one on the exterior side surface walls of the bridge key channel and one within the corner key channels on the opposite side of the walls of each bridge key channel, being complimentary reinforcing locks. The friction fitting corner locking keys may be pentagonal, triangular, cylindrical or any shape with the corner key channels modified to correspond accordingly as long as they retain their friction fitting function and are interchangeable parts which may be rapidly unlocked, removed and reused, being small, lightweight, and easily lifted and transported.

It is another main objective of the invention to use rapid on-the-fly insertion of friction fitted center bore hole locking keys within the center bore hole key channels of twenty sided shaped hollow uniform building component to lock multiple adjacent twenty sided shaped hollow uniform building components simultaneously, being the center bore hole lock of the invention, and being a complimentary reinforcement lock within the entire structure when combined with any other lock of the invention. Center bore hole locking keys may extend across the entire width of a structural building in either or both of two directions perpendicular to each other. They may be short pieces, long pieces, straight pieces or curved pieces of any length. Their outside diameter must be only slightly smaller than the corresponding center bore hole size. The center bore hole locking keys are always parallel to the primary locking keys and always perpendicular to the primary locked bridge key channels throughout the structure and pass through them beneath or above each uniform whole bridge key. The center bore hole locking keys are always perpendicular to any corner locking keys throughout the structure and pass beside or between them; Therefore, the primary locked bridge keys may be surrounded by one or more corner locking keys and center bore hole locking keys perpendicular to each other and evenly spaced throughout the structure, being a triple locked structure. The friction fitting center bore hole locking keys are interchangeable parts and may be rapidly unlocked, removed and reused, being small, lightweight, and easily lifted and transported.

It is another main objective of this invention to use rapid on-the-fly insertion of friction fitting uniform transverse bridge keys and center bore hole locking keys to lock the end surface of one cube to the side surface of another cube or vise versa. This enables a rapid change of orientation of the locked components while remaining flush with the existing locked structure. This provides an advantage of carrying the load from higher tiers of the building down through the locked walls and more flexible structural design choices. The manufactured cube shaped hollow uniform building component is configured to lock together with identical cubes in transverse alignment orientation in addition to the primary lock orientations previously described. The transverse alignment orientations are opposites of each other, being side-to-end flush transverse alignment or end-to-side flush transverse alignment. The resulting finished transverse lock is substantially identical. A two procedure locking process accomplishes the finished transverse lock and these two processes are reversed to accomplish the same lock in reverse order. In other words, any end surface of a cube may be locked to any side surface of a cube or any side surface of a cube may be locked to any end surface of a cube, being the two transverse lock orientations. The transverse lock is accomplished using the uniform transverse bridge key friction fitted into the end of one cube within internal central cavity 9 in either of two directions having two parallel side surfaces with two center bore holes that mutually align with the two center bore holes of the cube shaped hollow uniform building component, being the center bore hole key channel, which is friction fitted with one corresponding center bore hole locking key, being the first of two procedures of the lock, followed by friction fitting any of the four recessed bridge key channels of another cube over the protruding portion of the transverse bridge key until mutual alignment of their adjacent pairs of center bore holes is accomplished, being the transverse center bore hole key channel, which is friction fitted with the second corresponding center bore hole locking key, being the second procedure of the lock and completing the transverse lock, being a uniform whole transverse locked building member able to sustain itself independent of additional materials and processes. The transverse lock is a separate and distinct lock within the structure.

Reinforcement operations often occur in conventional building methods by incorporating reinforcement materials into permanent building processes such as the placement of metal reinforcement rod and pouring of grout or concrete, and require additional time consuming construction steps which are labor intensive with varying results depending on the skill of the laborers, quality of materials, etc. This invention improves the processes for reinforcement of structures and incorporates additional locks as reinforcement operations independent of the primary bonding process while simultaneously speeding up the reinforcement process providing the advantages of reducing labor costs and greater structural strength. The additional locks are rapidly friction fitted on-the-fly in addition to the primary locks of the structure and are evenly spaced within the structure and may be rapidly unlocked, removed, and reused as interchangeable parts throughout the structure or other structures.

It is another main objective of the invention to manufacture the interchangeable cube shaped hollow uniform building component in conventional building increments providing a method to conveniently measure and calculate the number of components needed to achieve a particular height, width, and depth of a desired structure, being a universal measurement device throughout the entire structure, which solves the problem of the time consuming and expensive need to measure and cut on the building site with varying results, since distance in all directions is pre-determined by the incremental size of the identical cube shaped hollow uniform building components being used. The cube shape of the components also insures that all identical cubes are locked in parallel or perpendicular to every other cube in the structure, reducing the time consuming need to measure for squareness or plumbness saving the labor costs associated with these measuring operations.

It is another main objective of the invention that the key channels of each shaped hollow uniform building component have multiple useful purposes in addition to accomplishing the primary lock, corner lock, center bore hole lock, and transverse lock; Any and all of the unobstructed key channels of any locked building member or locked structure of the invention may be used to provide additional useful advantages. For instance, locking key restraints, plumbing, electrical, mechanical, magnetic, solar or other improvement or enhancement elements may be threaded, fitted, or otherwise installed or locked within the interior or on the exterior of any locked structure.

Design changes often involve expensive demolition and rework including more measuring and cutting, adding materials and labor costs to build the structure. The building locks of this instant invention use rapidly friction fitted, interchangeable, unlockable, removable, and reusable parts. Any enhancement components of the invention including locking key restraint components may be any shape or design which is removable and reusable. If any optional locking key restraint of the invention uses a threaded design the corresponding locking key may use the modified threaded design as long as it remains friction fitting to accomplish it's friction fitting locking function. Only small hand tools are needed to accomplish the building/locking processes. These methods enable design changes to be rapidly implemented without materials waste providing a significant economic advantage. For instance, since cube shaped building components can be locked to themselves with bridge keys and/or transverse bridge keys into a variety of building structures and since cube shaped components are corner components too, conventional footings and frame members may be combined into monolithic frames and walls including the footings, which may be changed frequently and repeatedly until the builder accomplishes the desired configuration. Conventional concrete slab foundations may be eliminated.

BRIEF DESCRIPTION OF THE SEVERAL VIEWS OF THE DRAWING

The novel features that characterize the invention are set forth in the appended claims. The invention itself, however, as well as other features and advantages thereof, will be best understood by reference to the detailed description which follows, read in conjunction with the accompanying drawings, wherein:

FIG. 1A to FIG. 1C are perspective, plan and side views respectively of a uniform whole bridge key and primary locking key, which are friction fitting locking keys used in combination, deployed simultaneously, together being the main friction fitting locking element bonding shaped hollow uniform building components into uniform friction fitting primary locked structures having various configurations in accordance with the present invention;

FIG. 3A to FIG. 3C are perspective, plan and side views respectively of an arcuate shaped hollow uniform building component, being another main building component used to build locked structures, each component describing an arc of fifteen degrees, in accordance with the present invention;

FIG. 4A and FIG. 4B are perspective and plan views respectively showing an example of adjacent, opposed in mirror image to each other, flush, in like side surface to like side surface alignment orientation of two cube shaped hollow uniform building components and the friction fitting pathways through shared bridge key channels and shared primary key channels that bridge keys and primary locking keys are friction fit into, bonding the building components into a uniform friction fitting primary locked squared structure;

FIG. 4C and FIG. 4D are perspective and plan views respectively of two cube shaped hollow uniform building components aligned adjacent, opposed in mirror image to each other, flush, in like side surface to like side surface orientation, bonded into a uniform whole friction fitting primary locked squared structural building, using a uniform horizontal half bridge key locked flush to the bottom, not visible, and a uniform whole bridge key locked with the top half protruding above the aligned building components ready to friction fit lock more cube shaped building components in the next tier above;

FIG. 5C and FIG. 5D are perspective and plan views respectively of one cube shaped hollow uniform building component and one arcuate shaped hollow uniform building component aligned, opposed in mirror image to each other, flush, in like side surface to like side surface orientation, bonding the building components into a combined locked uniform whole friction fitting structural building, primary locked squared and locked with building components each describing an arc of fifteen degrees, using a uniform horizontal half bridge key locked flush to the bottom, not visible, and a uniform whole bridge key locked with the top half protruding above the aligned building components ready to friction fit lock more cube shaped and arcuate shaped building components in the next tier above;

FIG. 16A is a perspective view, being an exploded view of a transverse lock.

DETAILED DESCRIPTION OF THE INVENTION

Figure 2A:
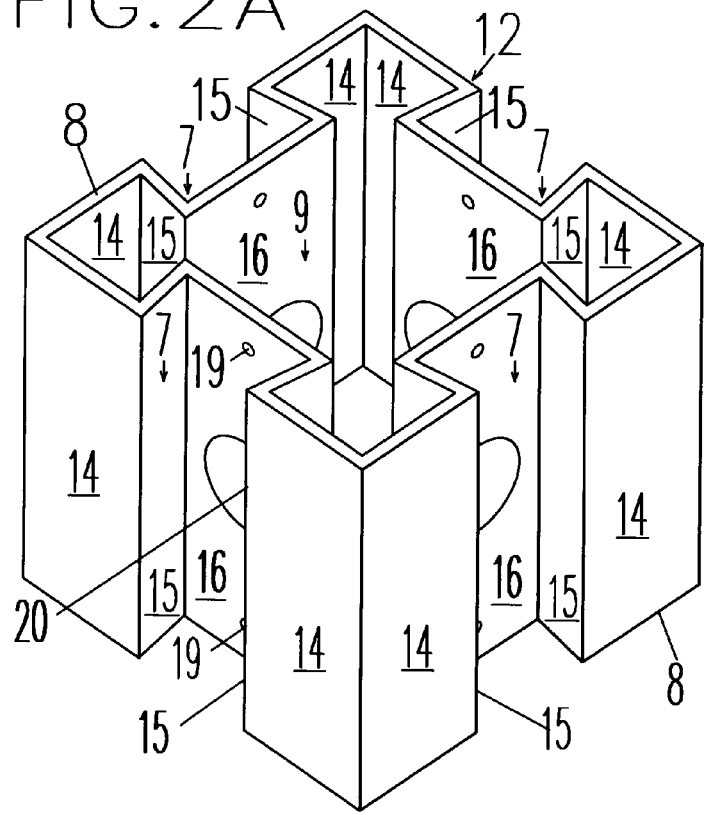
FIG. 2A to FIG. 2C are perspective, plan and side views respectively of a cube shaped hollow uniform building component, being the primary building component used to build locked squared structures in accordance with the present invention.

In the drawings, to facilitate the description, the same or similar parts, functioning in the same or similar manner, are designated with the same numerals.

Figure 2B:
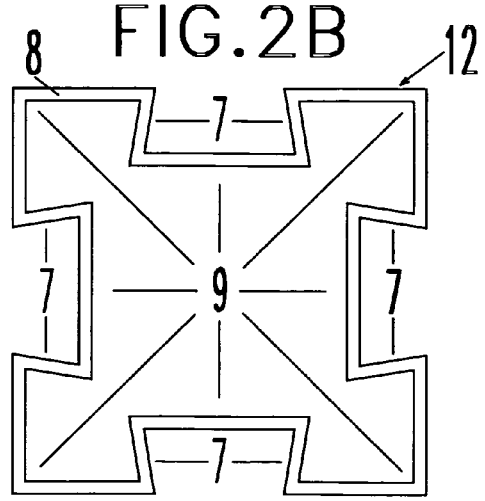
Figure 2C:
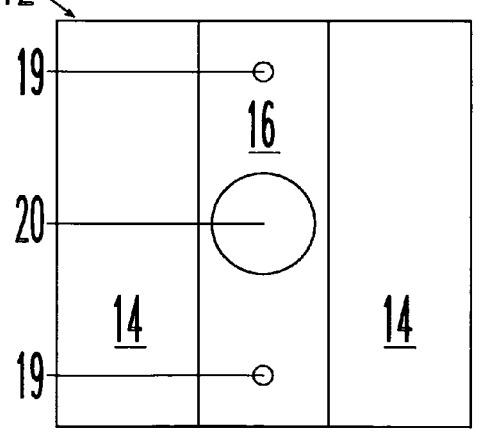
Figure 5A:
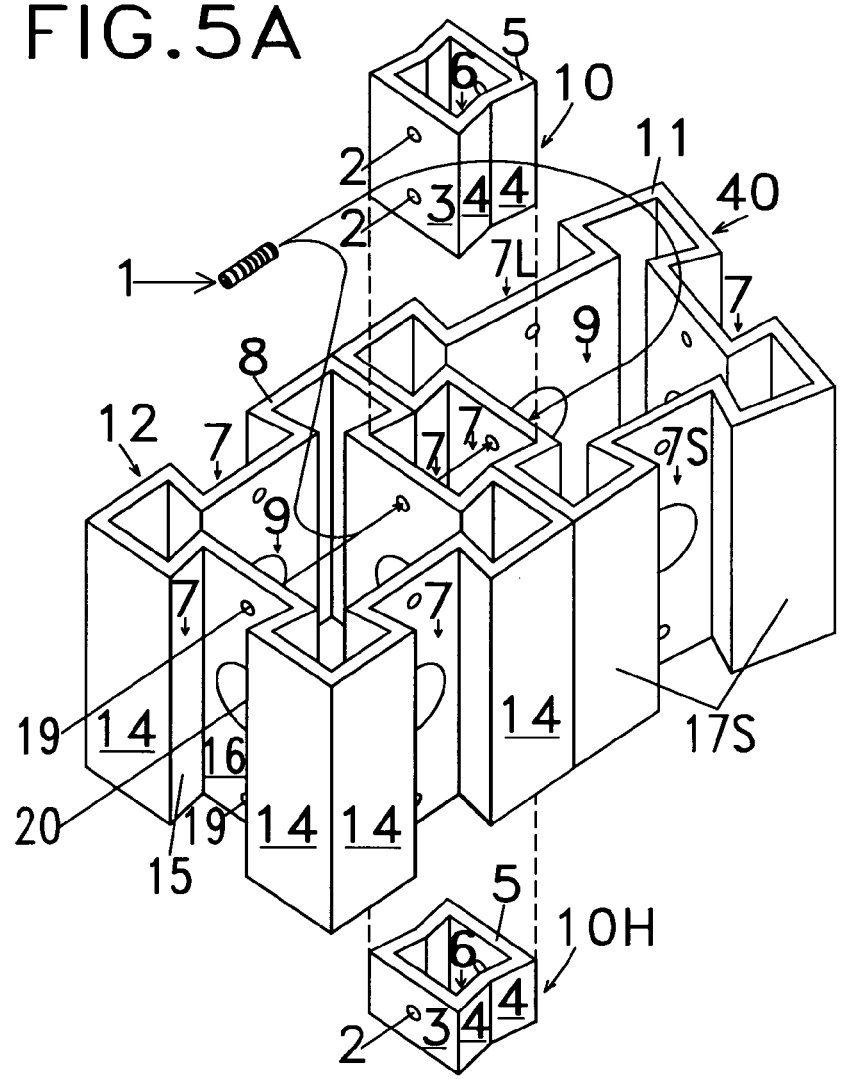
FIG. 5A and FIG. 5B are perspective and plan views respectively showing an example of the adjacent, opposed in mirror image to each other, flush in like side surface to like side surface orientation of one cube shaped hollow uniform building component and one arcuate shaped hollow uniform building component and the friction fitting pathways through shared bridge key channels and shared primary key channels that bridge keys and primary locking keys friction fit into, bonding the building components into a combined locked uniform whole friction fitting structural building, primary locked squared and locked with building components each describing an arc of fifteen degrees.
Figure 5B:
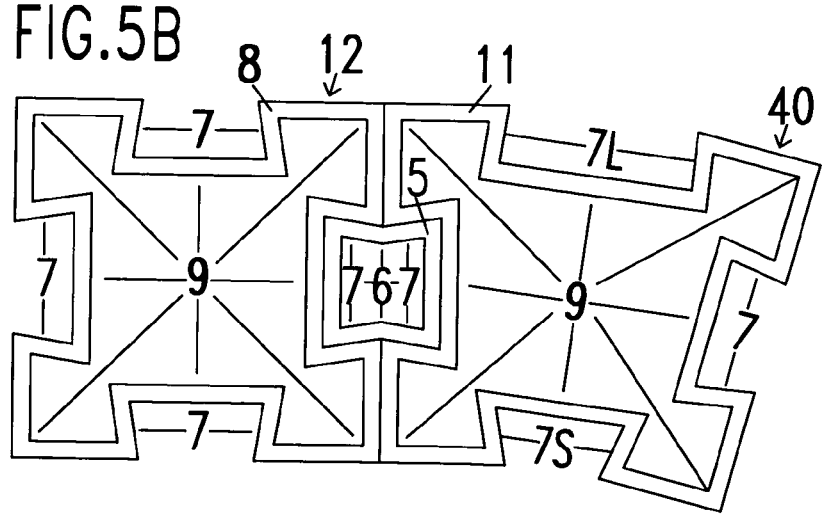
Figure 5E:
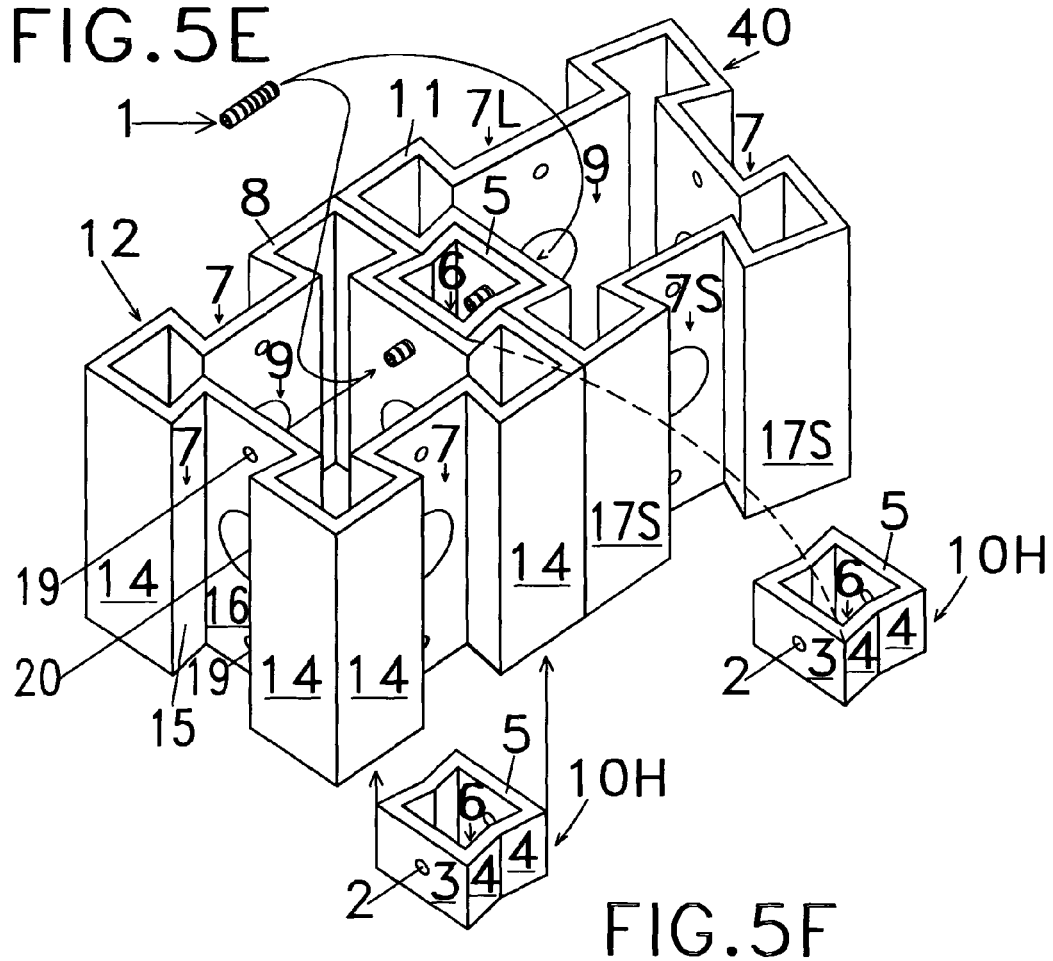
FIG. 5E and FIG. 5F are perspective and plan views respectively of the same components and locks shown in FIG. 5C and FIG. 5D except primary locking keys friction fit bond two uniform horizontal half bridge key friction fitting locking keys flush with the bottom and top of the cube shaped and arcuate shaped building components into a combined locked uniform whole friction fitting structural building, primary locked squared and locked with building components each describing an arc of fifteen degrees, and no whole bridge key is used.
Figure 5F:
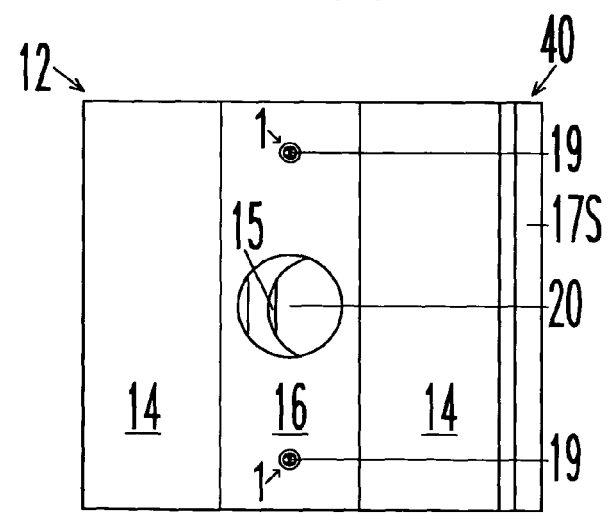
Figure 6A:
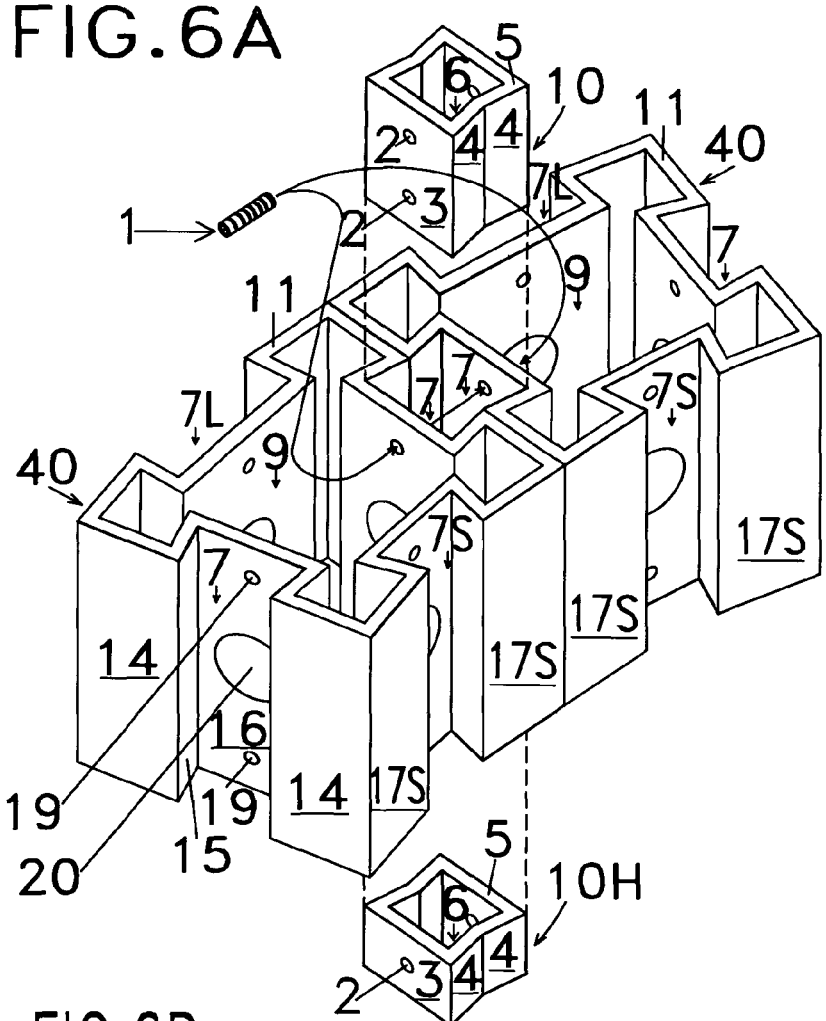
FIG. 6A and FIG. 6B are perspective and plan views respectively showing an example of the adjacent, opposed in mirror image to each other, flush, in like side surface to like side surface orientation of two arcuate shaped hollow uniform building components and the friction fitting pathways through shared bridge key channels and shared primary key channels that bridge keys and primary locking keys friction fit into bonding the building components into a uniform friction fitting primary locked structural building with building components each describing an arc of fifteen degrees.
Figure 6B:
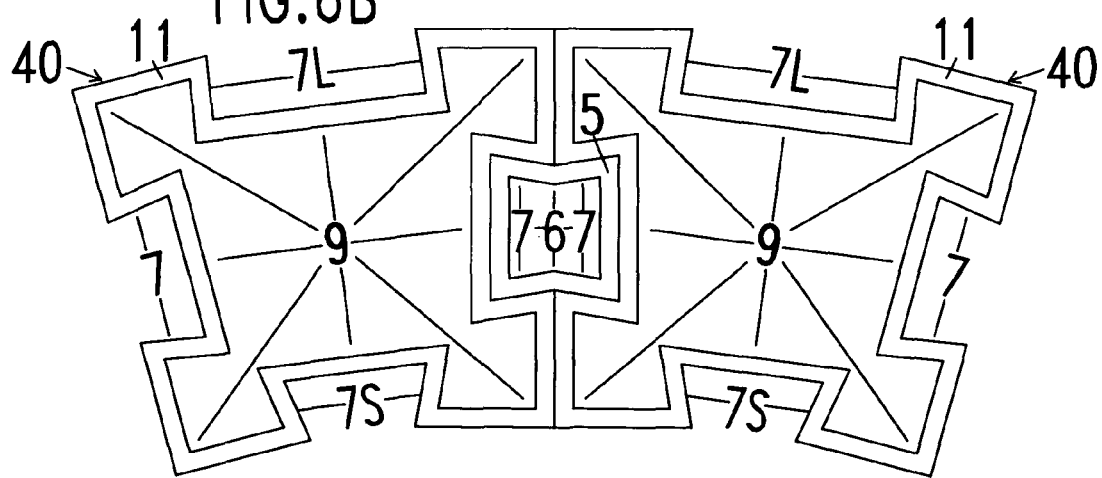
Figures 6C, 6D:
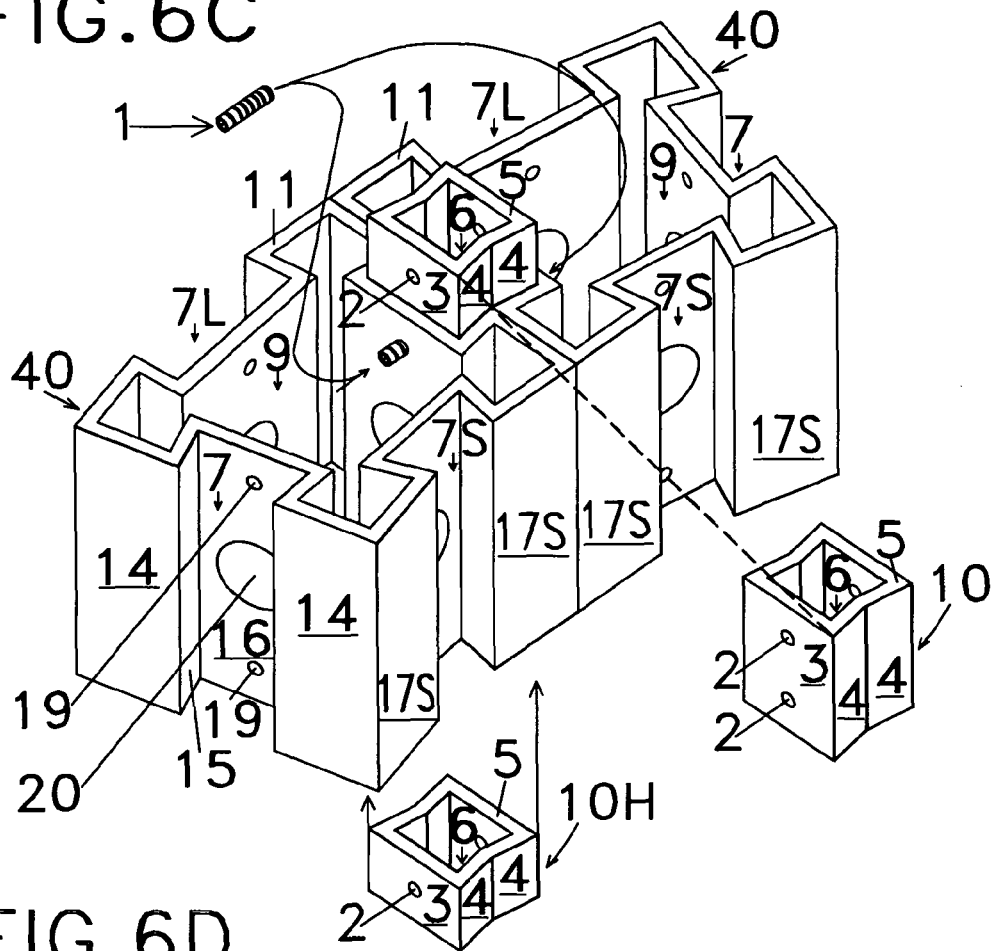
FIG. 6C and FIG. 6D are perspective and plan views respectively of two arcuate shaped hollow uniform building components aligned adjacent, opposed in mirror image to each other, flush, in like side surface to like side surface orientation, bonded into a uniform friction fitting primary locked structural building with building components each describing an arc of fifteen degrees using a uniform horizontal half bridge key locked flush to the bottom, not visible, and a uniform whole bridge key locked with the top half protruding above the aligned building components ready to friction fit lock more arcuate shaped building components in the next tier above.
Figure 6E:
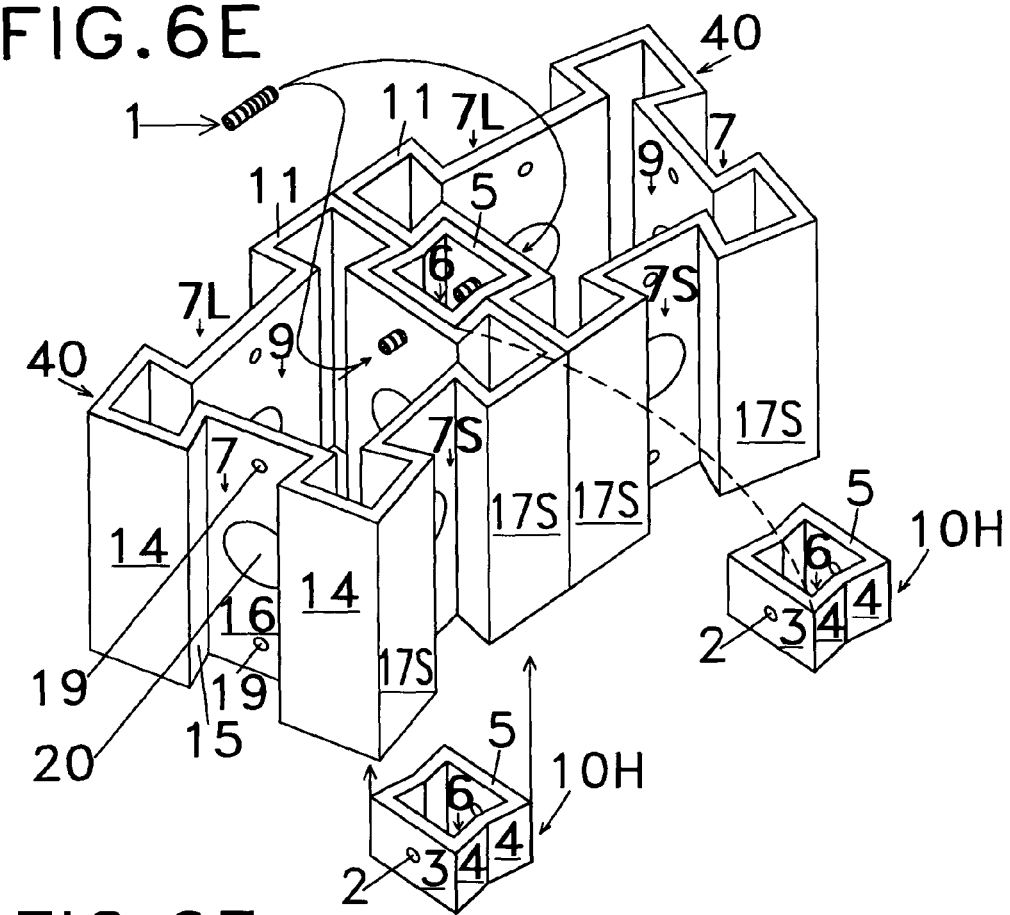
FIG. 6E and FIG. 6F are perspective and plan views respectively of the same components and locks shown in FIG. 6C and FIG. 6D except primary locking keys friction fit bond two uniform horizontal half bridge key friction fitting locking keys flush with the bottom and top of the arcuate shaped building components into a uniform friction fitting primary locked structural building with building components each describing an arc of fifteen degrees and no whole bridge key is used.
Figure 6F:
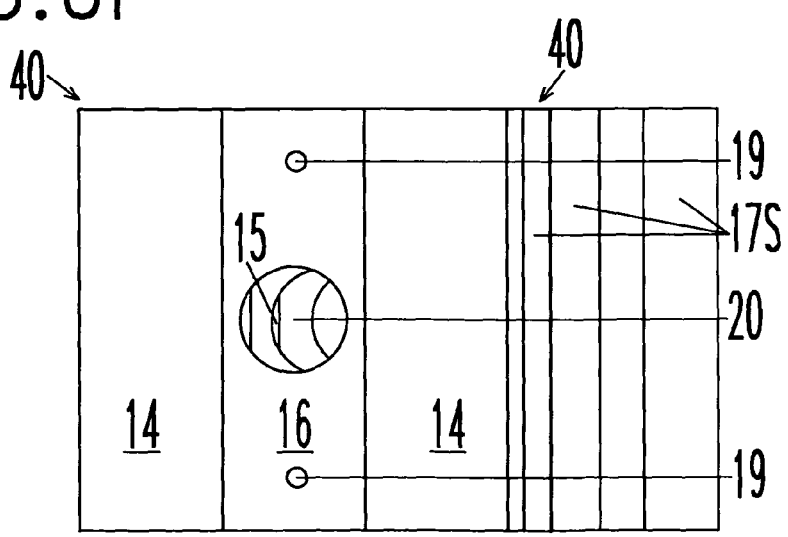
Figure 7:
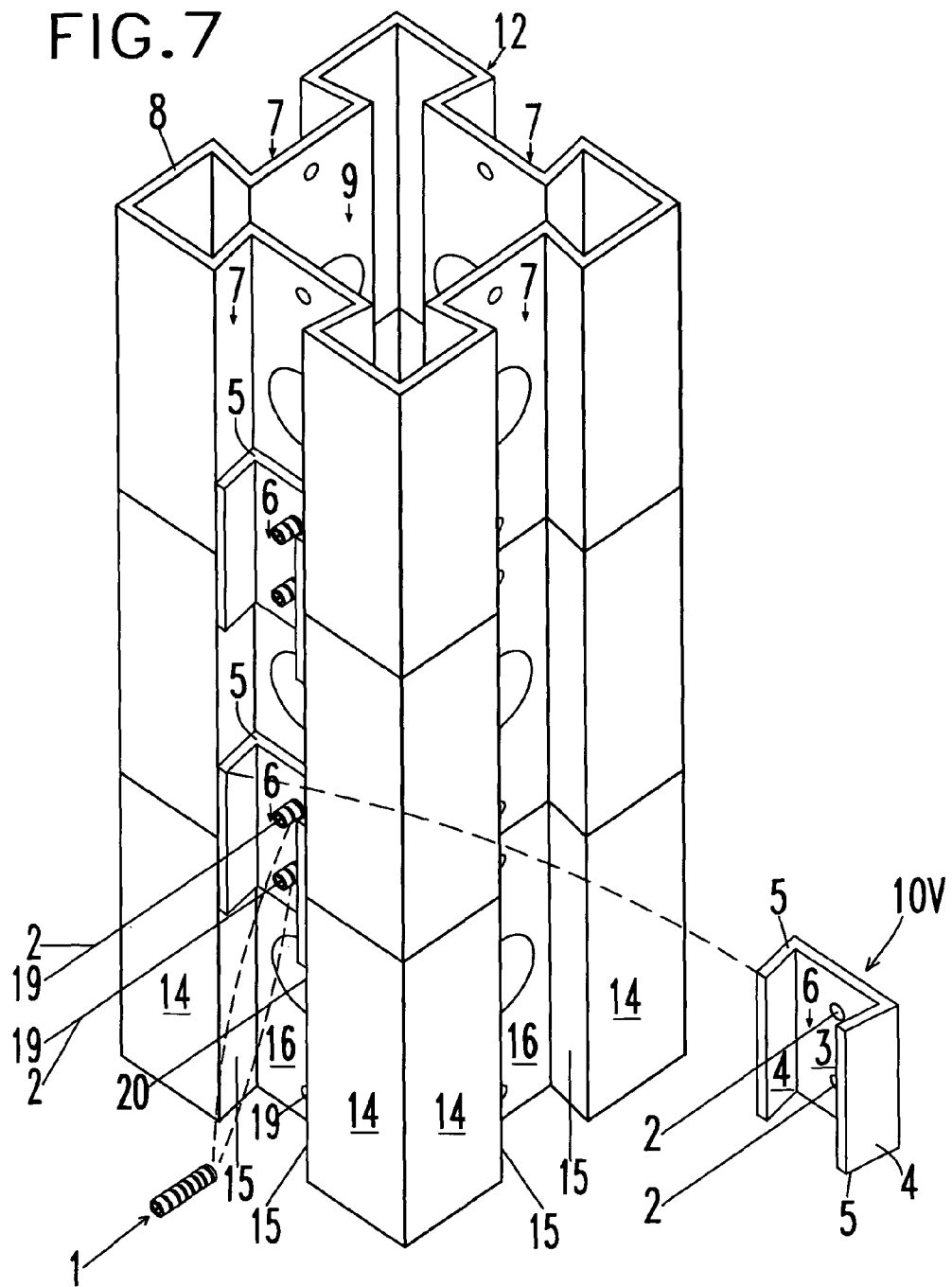
FIG. 7 is a perspective view of three cube shaped hollow uniform building components aligned flush, stacked like end surface-to-like end surface on top of each other and bonded into a vertical uniform friction fitting primary locked squared structure, using uniform vertical half bridge keys in combination with corresponding primary locking keys, being friction fitting locking keys used exclusively to bond the building components into a locked squared structure having flush side surfaces.
Figure 8:
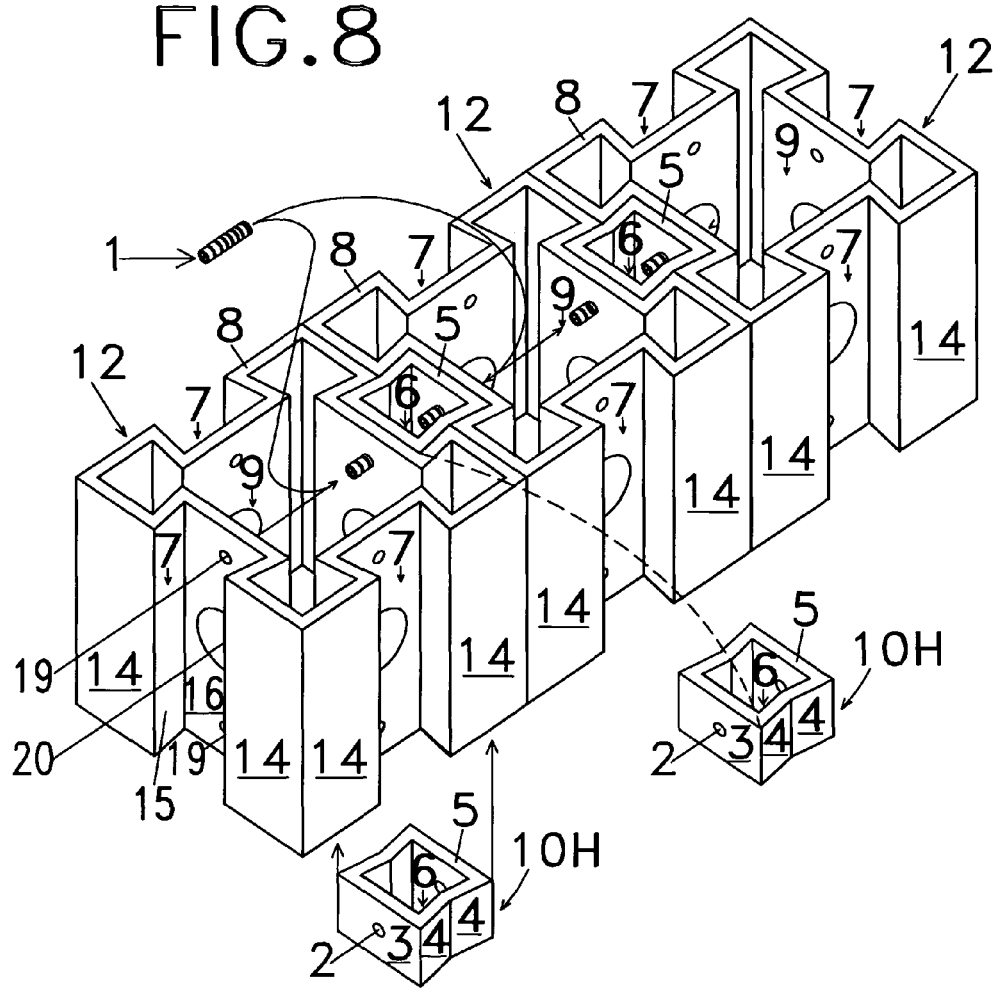
FIG. 8 is a perspective view of three cube shaped hollow uniform building components aligned flush, like side surface to like side surface and bonded into a horizontal uniform friction fitting primary locked squared structure using uniform horizontal half bridge keys in combination with corresponding primary locking keys, being friction fitting locking keys used exclusively to bond the building components into a locked squared structure having flush end surfaces.
Figure 9:
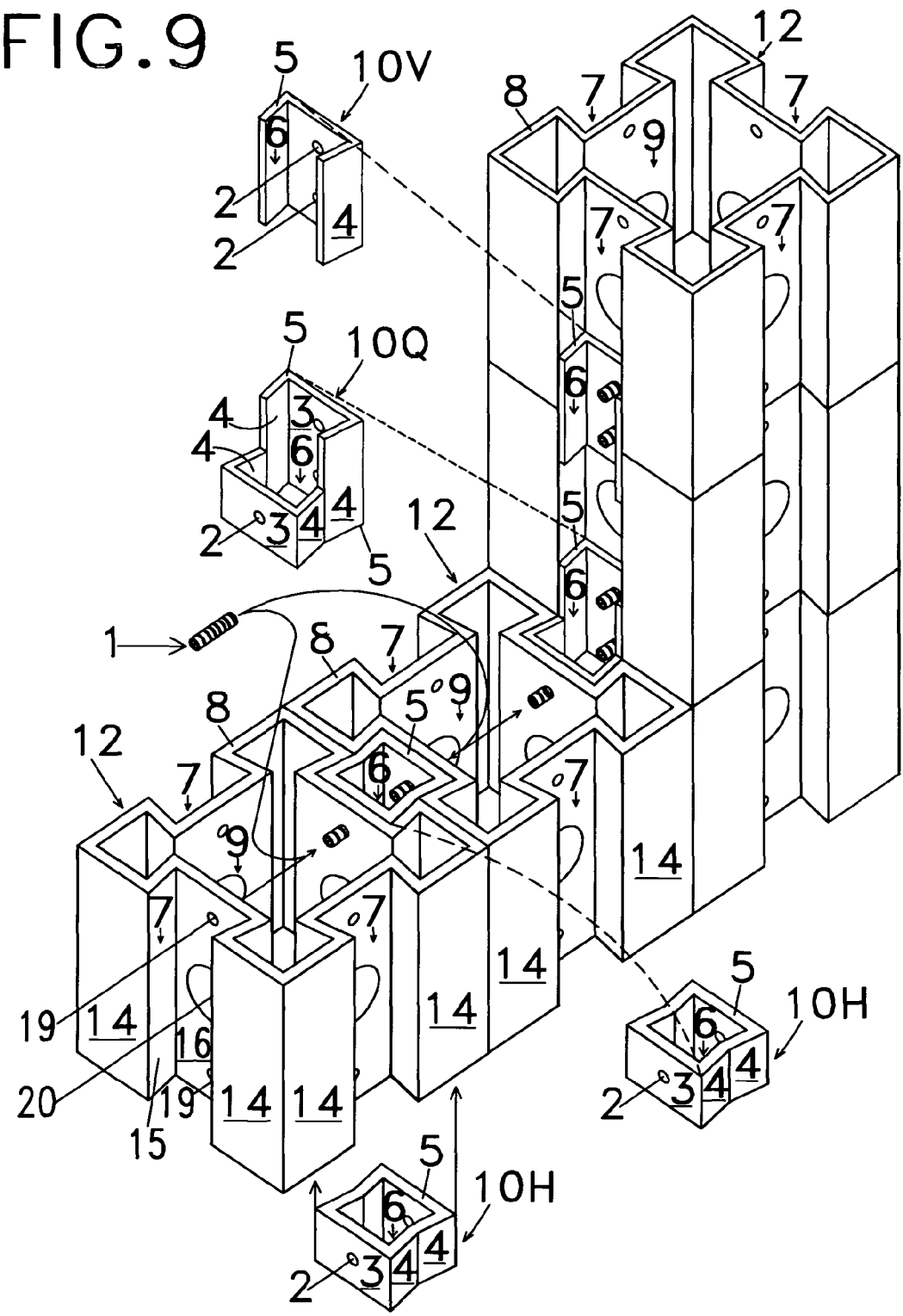
FIG. 9 is a perspective view of one cube shaped hollow uniform building component having two corresponding cube shaped hollow uniform building components aligned flush, stacked like end surface to like end surface on top of each other and having two corresponding cube shaped hollow uniform building components aligned flush, like side surface to like side surface simultaneously, using the friction fitting locking keys previously demonstrated in FIG. 7 and FIG. 8 and using one uniform three quarters bridge key combined with primary locking keys bonding the interior of the uniform friction fitting primary locked squared structure flush with the building components end surfaces and side surfaces.
Figure 10:
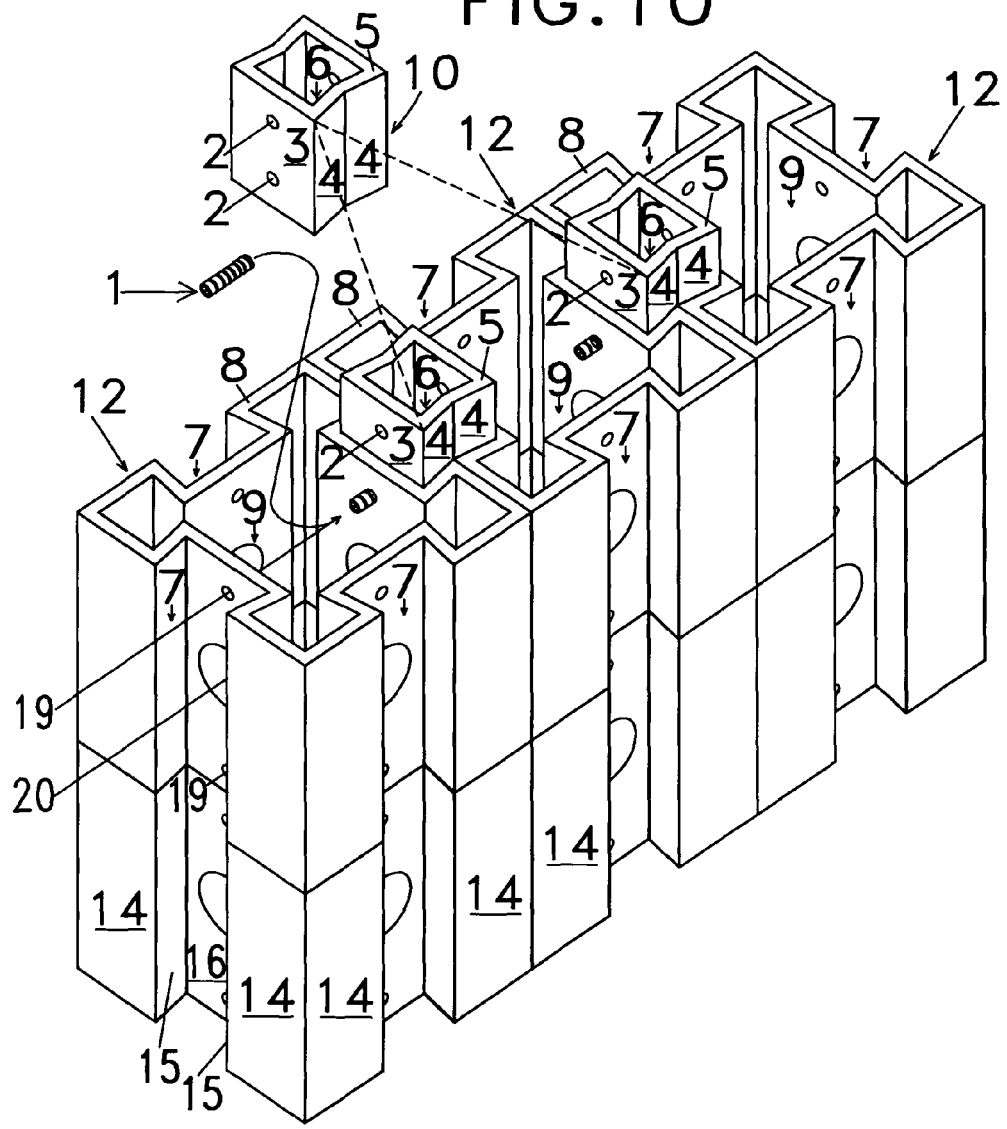
FIG. 10 is a perspective view of six cube shaped hollow uniform building components bonded into a uniform friction fitting primary locked squared structure having two tiers and ready for friction fit locking another tier of corresponding building components as previously demonstrated in FIG. 4C and FIG. 4D.
Figure 11:
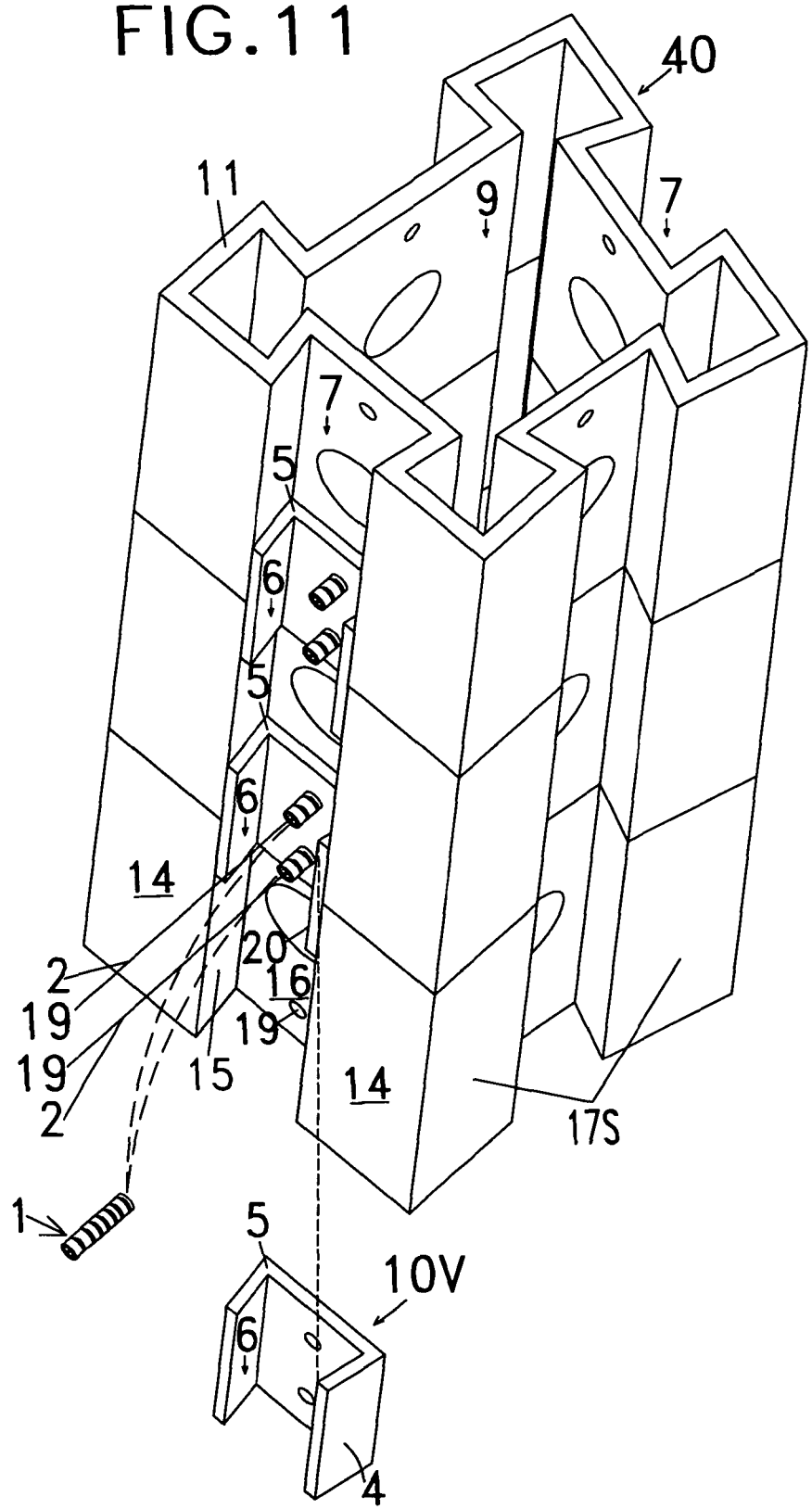
FIG. 11 is a perspective view of three arcuate shaped hollow uniform building components aligned flush stacked, like end surface to like end surface on top of each other and bonded into a vertical uniform friction fitting primary locked structural building, with each component describing an arc of fifteen degrees, using uniform vertical half bridge keys in combination with corresponding primary locking keys, being friction fitting locking keys used exclusively to bond the building components into a locked structural building with each component describing an arc of fifteen degrees, having flush side surfaces.
Figure 12:
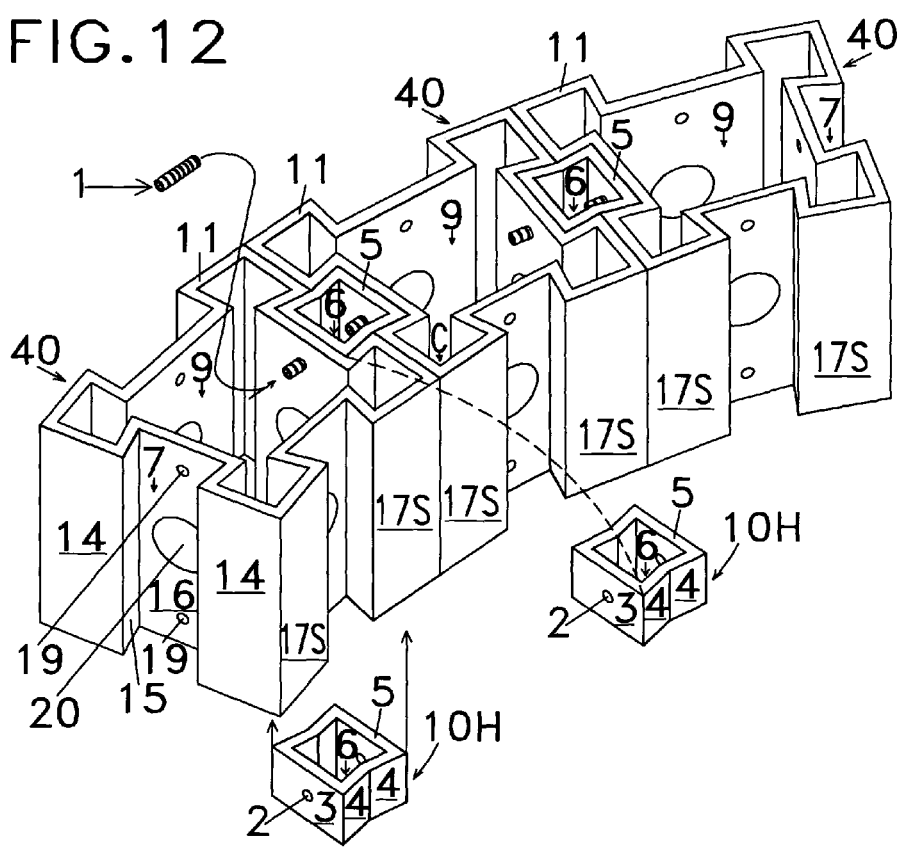
FIG. 12 is a perspective view of three arcuate shaped hollow uniform building components aligned flush, like side surface to like side surface and bonded into a horizontal uniform friction fitting primary locked structural building with each component describing an arc of fifteen degrees, using uniform horizontal half bridge keys combined with corresponding primary locking keys, being friction fitting locking keys used exclusively to bond the building components into a locked structural building with each component describing an arc of fifteen degrees, having flush end surfaces.
Figure 13:
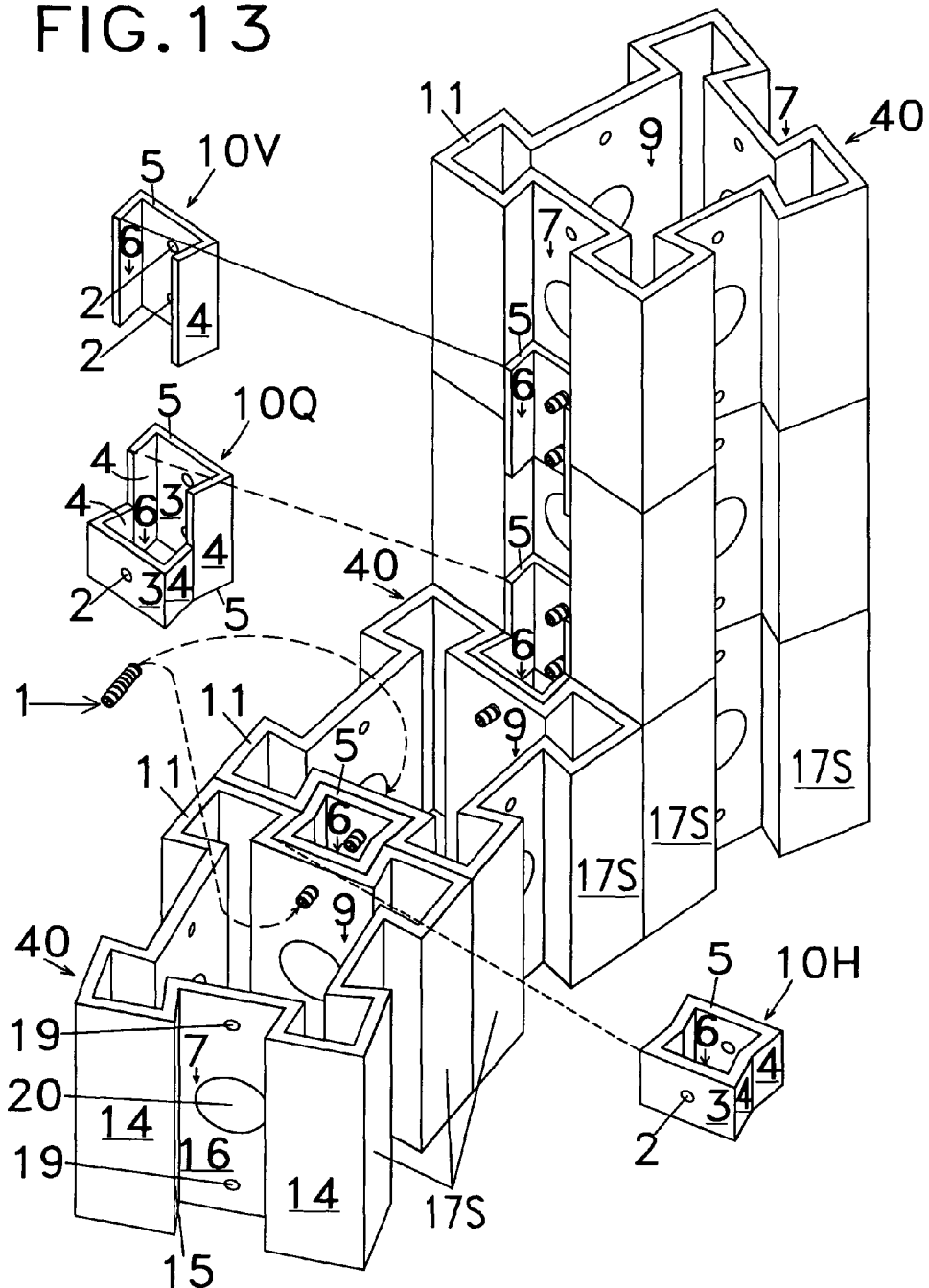
FIG. 13 is a perspective view of one arcuate shaped hollow uniform building component having two corresponding arcuate shaped hollow uniform building components aligned flush, stacked like end surface to like end surface on top of each other and having two corresponding manufactured arcuate shaped hollow uniform building components aligned flush, like side surface to like side surface simultaneously, using the friction fitting locking components previously demonstrated in FIG. 11 and FIG. 12 and using one uniform three quarters bridge key combined with primary locking keys bonding the interior of the uniform friction fitting primary locked structural building with each component describing an arc of fifteen degrees flush with the building components end surfaces and side surfaces.
Figure 14:
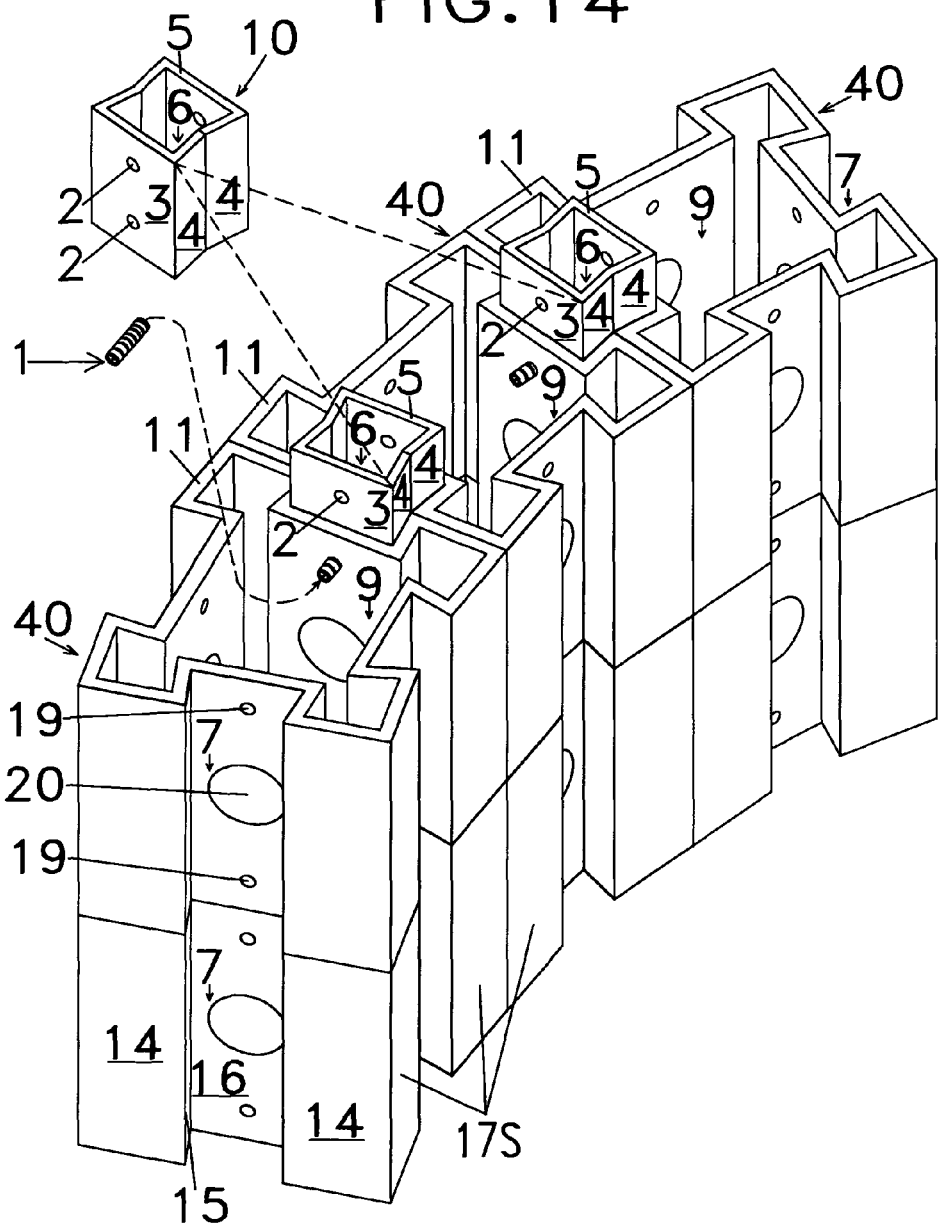
FIG. 14 is a perspective view of six arcuate shaped hollow uniform building components bonded into a uniform friction fitting primary locked structural building with each component describing an arc of fifteen degrees, having two tiers and ready for friction fit locking another tier of corresponding building components as previously demonstrated in FIG. 6C and FIG. 6D.
Figure 15:
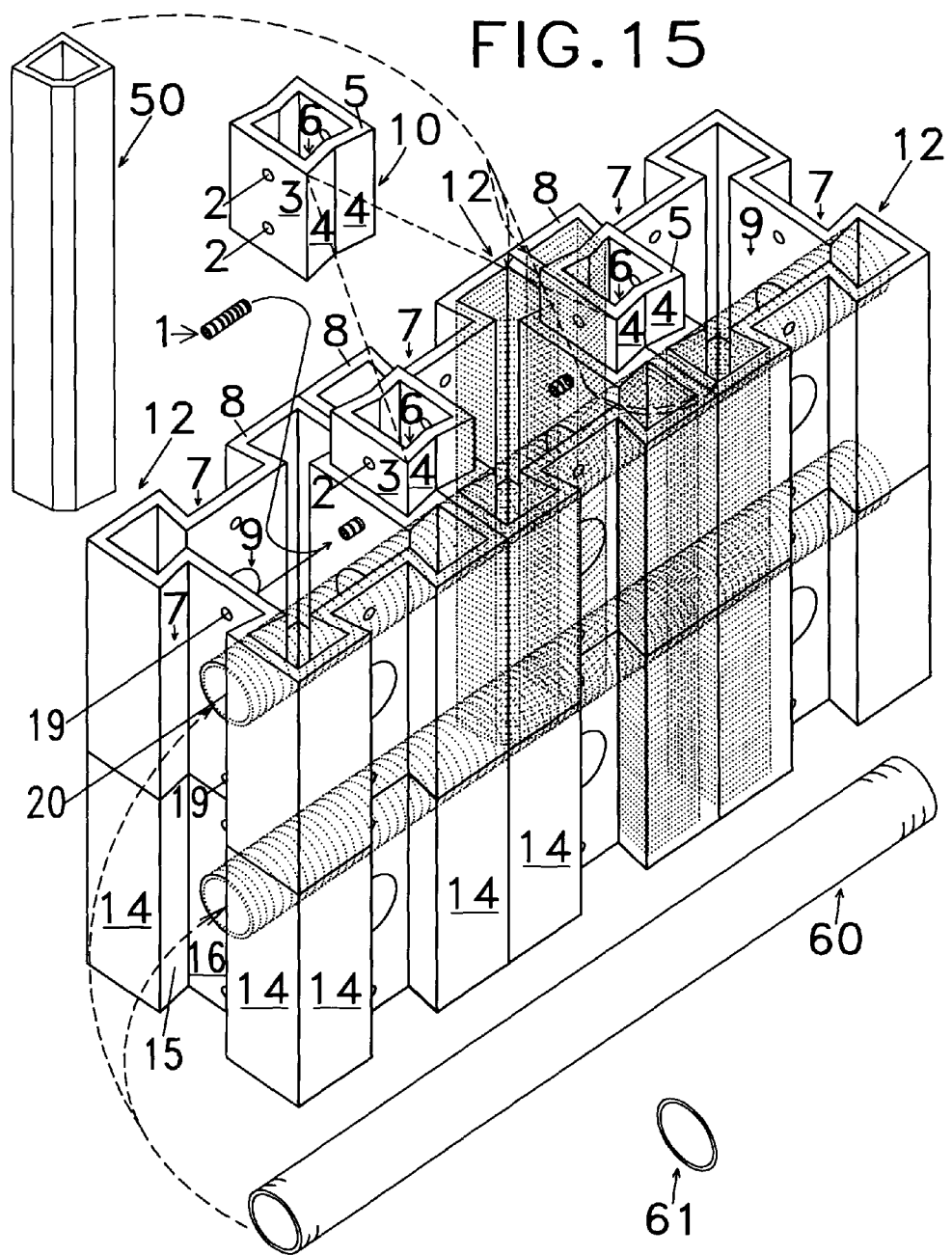
FIG. 15 is a perspective view of six cube shaped hollow uniform building components bonded into a uniform friction fitting primary locked squared structure previously demonstrated in FIG. 10 and two other friction fitting locking components and their respective locked positions within the locked structure are illustrated, first is a cylindrical center bore hole locking key bonded through shared center bore hole key channels in each of two tiers into center bore hole locks and second is a corner locking key conforming to the corner cavity shape bonded through four shared corner key channels and through two stacked tiers into corner key locks in accordance with the present invention.
Figure 16B:
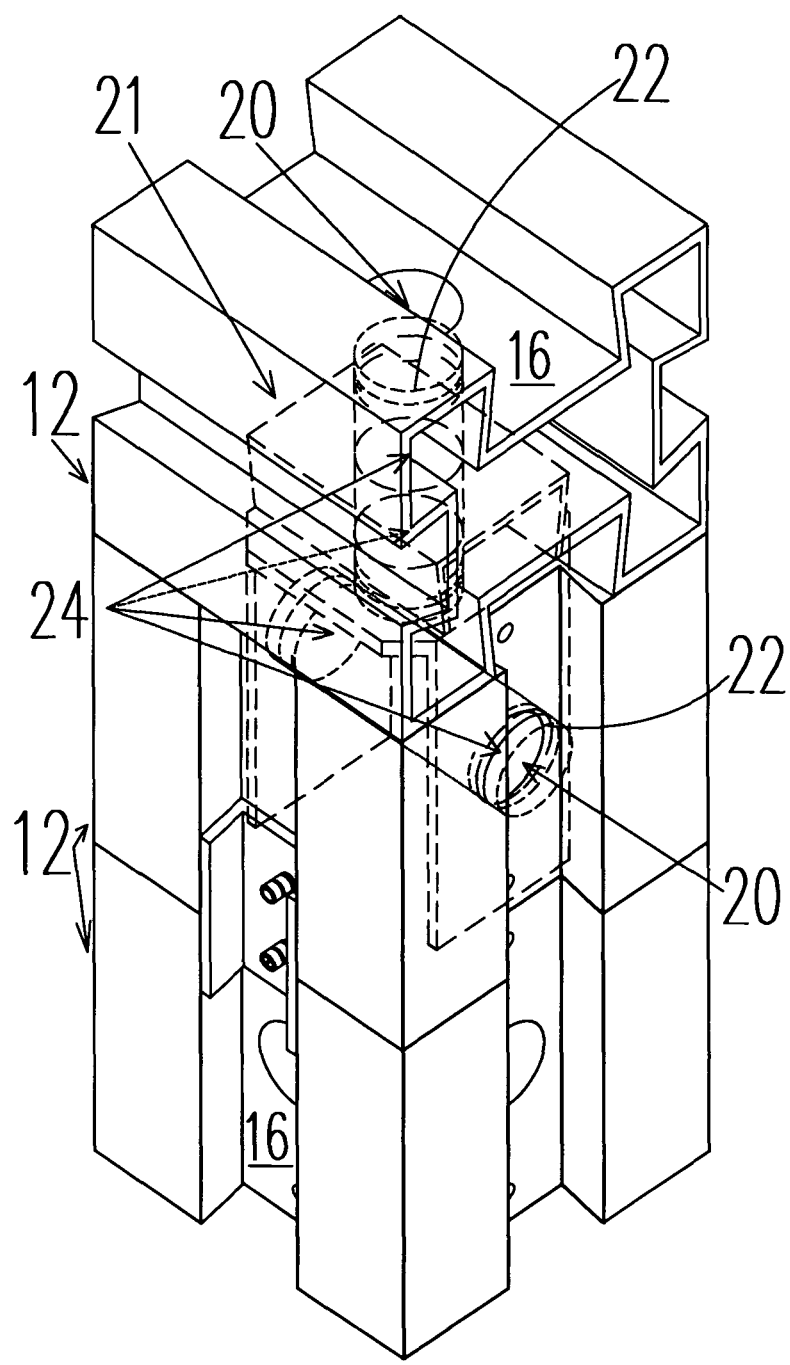
FIG. 16B shows a perspective view of the same friction fitting locking keys in the transverse locked position in accordance with the present invention.

The following description deals primarily with six sided shaped uniform whole bridge key (10), six sided shaped uniform horizontal half bridge key (10H), six sided shaped uniform three quarters bridge key (10Q), three sided shaped uniform vertical half bridge key (10V) and cylinder shaped primary locking key (1) (FIGS. 1A, 1B, &1C); (FIGS. 4A, 4C, 4D, &4E); (FIGS. 5A, 5C, 5D, &5E); (FIGS. 6A, 6C, &6E); (FIGS. 7, 8, 9, 10, 11, 12, 13, 14 &15); And, twenty sided cube shaped hollow uniform building component (12) (FIGS. 2A, 2B, &2C); (FIGS. 4A, 4B, 4C, 4D, 4E, &4F); (FIGS. 7, 8, 9, 10, 15, 16A, &16B); And, with appropriate modifications the description applies equally to twenty sided arcuate shaped hollow uniform building component describing an arc of fifteen degrees (40) (FIGS. 3A, 3B, &3C); (FIGS. 6A, 6B, 6C, 6D, 6E &6F); (FIGS. 11, 12, 13, &14); And, with appropriate modifications the description applies equally to combining twenty sided cube shaped hollow uniform building component (12) and twenty sided arc shaped hollow uniform building component describing an arc of fifteen degrees (40) (FIGS. 5A, 5B, 5C, 5D, 5E, &5F); And, the description applies equally to corner locking key (50) and center bore hole locking keys (60) (FIG. 15); And, the description applies equally to transverse bridge key (21) (FIGS. 16A & 16B); And, the description applies equally to optional locking key restraints, being primary locking key restraint (101) (shown with corresponding threaded longer primary locking key (1)) and threaded center bore hole locking key restraint (61A & 61B) (shown with corresponding threaded center bore hole locking key (60)) which may be used at the option of the builder after any lock or locks of the invention are finished (FIGS. 1A, 8, 15 & 16A). The six sided shaped uniform whole bridge key (10), six sided shaped uniform horizontal half bridge key (10H), six sided shaped uniform three quarters bridge key (10Q), three sided shaped uniform vertical half bridge key (10V) and cylinder shaped primary locking key (1) can be made of metal, metal alloy, polymer or polymer composite, wood or cement composite, or any natural and/or synthetic material(s). The components (12) and (40) can be made of metal, metal alloy, polymer or polymer composite, wood or cement composite, or any natural and/or synthetic material(s). Corner locking key (50), center bore hole locking key (60), uniform transverse bridge key (21), primary locking key restraint (101), center bore hole locking key restraint (61A and 61B), illustrated herein can be made of metal, metal alloy, polymer or polymer composite, wood or cement composite, or any natural and/or synthetic material(s).

Each six sided shaped uniform whole bridge key (10) being the friction fitting locking key in (FIG. 1A) And, visible in (FIGS. 1B & 1C); (FIGS. 4A, 4B, 4C, &4D); (FIGS. 5A, 5B, 5C, &5D); (FIGS. 6A, 6B, 6C, &6D); (FIGS. 10, 14 & 15) is an interchangeable uniform friction fitting locking key used to accomplish the primary lock of the invention and is one of the four separate and distinct shaped uniform bridge keys of the invention locked with primary locking keys (1) inserted perpendicular to the recessed bridge key channels 7 of a corresponding number of building components (12) or (40) and the corresponding uniform bridge key side surfaces 3 simultaneously penetrating mutually aligned internal central cavities 9 and 6 and primary locking key receiving holes 19 and 2, being the primary key channel resulting in a single bonded protruding finished primary lock and key joint, being a primary lock of flush building components (12) or (40) with the lower half of the six sided shaped uniform whole bridge key (10) while the upper half of uniform whole bridge key (10) remains exposed protruding above the flush end surfaces of building components (12) or (40) positioned to be locked with additional building components (12) or (40) in the next tier of the structure, being a friction fitting locked wall structural building or entire multi-tier primary locked structure; (10) may preferably be in the form of a six sided shaped hollow uniform whole with two identical parallel side surfaces 3 each having two bore holes 2, which when either is aligned with a corresponding bore hole 19 of adjacent uniform building components (12) or (40) is the primary key channel for receiving primary locking keys (1), with each primary locking key receiving hole 2 being located along the vertical center of side surface 3, one located approximately one inch from the top of side surface 3 and one located approximately one inch from the bottom of side surface 3; And, two identical pair of non parallel side surfaces 4 each pair converging at a center equidistant from parallel side surfaces 3 and each pair of side surfaces 4 located at opposite ends of parallel side surfaces 3; And, two identical top and bottom end surfaces 5. Each of the side surfaces 3 may have the configuration of a rectangle with a suitable length such as approximately four inches and a suitable width such as approximately two and one half inches and a suitable thickness such as approximately one quarter inch; And each pair of side surfaces 4 may have the configuration of a pair of adjacent rectangles with a suitable length for each such as approximately four inches and a suitable width for each such as approximately one and one quarter inch and a suitable thickness such as approximately one quarter inch for each adjacent rectangle. And, located at right angles to the side surfaces 3 and 4 each of the end surfaces 5 may have the configuration of a six sided irregular hexagonal figure corresponding to the six sided shape of the uniform whole bridge key having a width equal to the thickness of the bridge key walls of approximately one quarter inch with a hollow vertical cavity extending the entire distance between end surfaces 5 consisting of one centrally located internal cavity 6, being a distance of approximately four inches.

Each three sided shaped uniform vertical half bridge key (10V) (FIG. 7) And, visible in (FIGS. 9, 11, &13) may preferably be in the form of one uniform vertical half of the uniform whole bridge key (10) previously described herein; (10V) is an interchangeable uniform friction fitting locking key used to accomplish the primary lock of the invention and is one of the four separate and distinct shaped uniform bridge keys locked with primary locking keys (1) inserted perpendicular to the recessed bridge key channels 7 of one building component (12) or (40) and the corresponding uniform vertical half bridge key side surface 3 simultaneously penetrating aligned cavities 6, internal central cavity 9 and primary locking key receiving holes 19 and 2 through the lower half of (10V), being the primary key channel and achieving the first locking procedure of the lock. A substantially identical locking procedure through the primary key channel on the opposite side of component (12) or (40) is performed next followed by friction fitting the next component (12) or (40) in the next tier over the protruding top halves of the two bridge keys (10V) and friction fitting corresponding primary locking keys through corresponding primary key channels, resulting in a single bonded finished primary lock and key joint, being a uniform primary lock of flush building components (12) or (40) stacked in like end surface to like end surface alignment orientation with the lower halves of two six sided shaped uniform vertical half bridge keys (10V) locked to the bottom building component (12) or (40) while the upper halves of the two uniform vertical half bridge keys (10V) are locked to the top building component finishing the primary lock, being a locked uniform friction fitting whole post structural building. These locking procedures are repeated for each additional locked tier of the post.

Figure 4E:
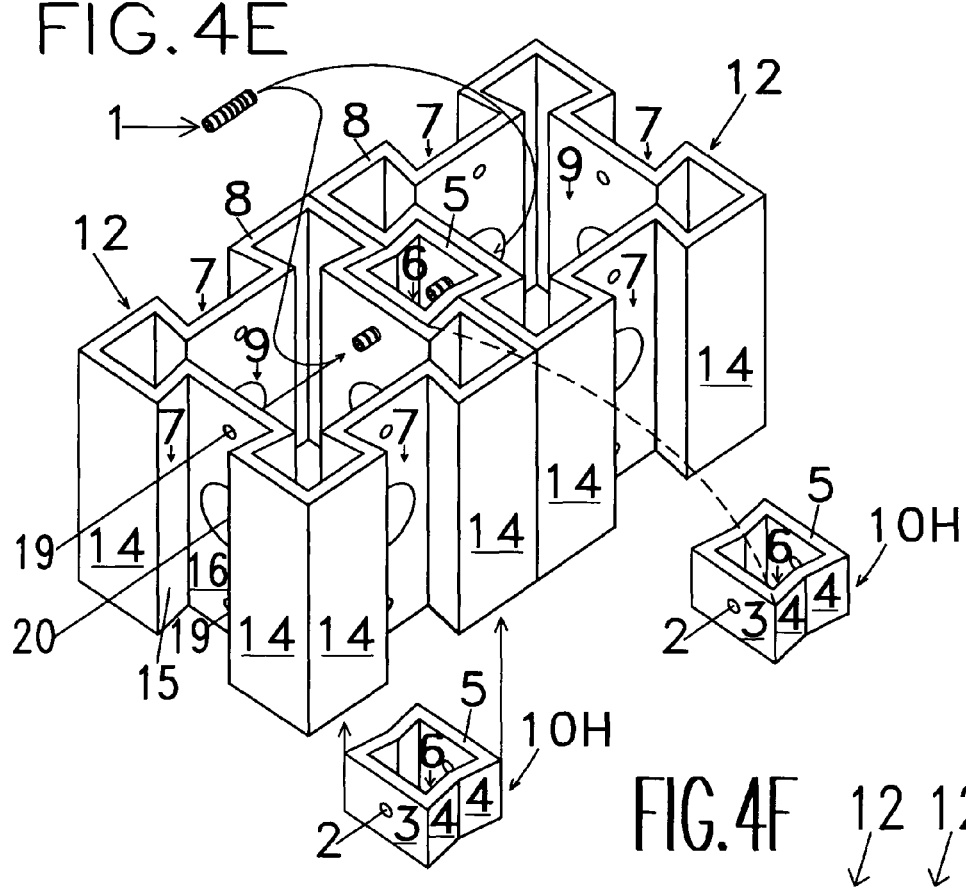
FIG. 4E and FIG. 4F are perspective and plan views respectively of the same components and locks shown in FIG. 4C and FIG. 4D except primary locking keys friction fit bond two uniform horizontal half bridge key friction fitting locking keys flush with the bottom and top of the cube shaped building components into a uniform primary locked squared structure and no uniform whole bridge key is used.
Figure 4F:
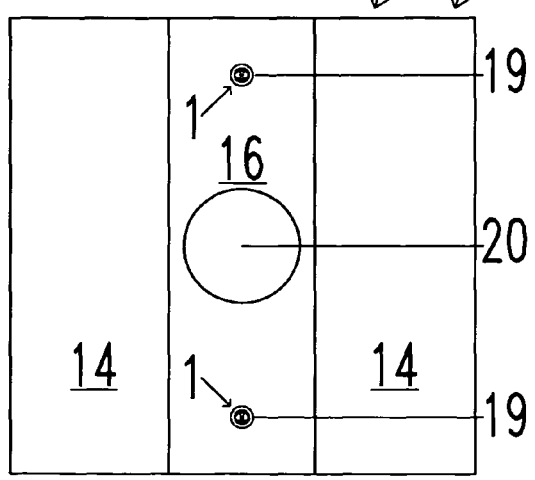

Each six sided shaped uniform horizontal half bridge key (10H) (FIG. 4A); And, visible in (FIGS. 4C & 4E); (FIGS. 5A, 5C, &5E); (FIGS. 6A, 6C, &6E); (FIGS. 8, 9, 12 &13) may preferably be in the form of one uniform horizontal half of the uniform whole bridge key (10) previously described herein. (10H) is an interchangeable uniform friction fitting locking key used to accomplish the primary lock of the invention and is one of the four separate and distinct shaped uniform bridge keys locked with primary locking keys (1) inserted perpendicular to the recessed bridge key channels 7 of both building components (12) or (40) and the corresponding uniform horizontal half bridge key (10H) side surfaces 3 simultaneously and penetrating their internal central cavities 9 and 6 and primary locking key receiving holes 19 and 2, being the primary key channel, resulting in a single bonded finished primary lock, being a flush locked uniform friction fitting whole beam structural building or flush locked uniform frame structural building; (FIG. 8) also illustrates a primary lock using a longer primary locking key (1) with both ends threaded and use of optional primary locking key restraint (101) restraining both ends of the corresponding threaded longer primary locking key (only one visible in the installed position in the drawing).

Each six sided shaped uniform three quarters bridge key (10Q) (FIGS. 9 &13) may preferably be in the form of one uniform three quarters portion of the uniform whole bridge key (10) previously described herein. (10Q) is an interchangeable uniform friction fitting locking key used to accomplish the primary lock of the invention and is one of the four separate and distinct shaped uniform bridge keys locked with primary locking keys (1) inserted perpendicular to the recessed bridge key channels 7 of three adjacent and abutting stacked end surface to end surface building components (12) or (40) and the corresponding uniform three quarters bridge key (10Q) side surfaces 3 simultaneously and penetrating their internal central cavities 9 and 6 and primary locking key receiving holes 19 and 2, being the primary key channel and resulting in a single bonded finished primary lock, being a flush interior corner uniform whole friction fitting frame structural building. Two lower building components (12) or (40), opposed in mirror image to each other in flush like side surface to like side surface alignment orientation are friction fitted with primary locking keys and corresponding uniform bridge key components (10Q) and ((10V) not visible on the opposite side of the building component), then another building component (12) or (40) is friction fitted over their respective protruding top halves and additional primary locking keys are fitted through the primary key channels to complete the primary locks.

Each primary locking key (1) (FIGS. 1A, 1B, &1C); (FIGS. 4A, 4C, 4D, 4E, &4F); (FIGS. 5A, 5C, 5D, 5E, &5F); (FIGS. 6A, 6C, &6E); (FIGS. 7, 8, 9, 10, 11, 12, 13, 14, &15) may preferably be in the form of a cylinder shape of suitable diameter such as approximately one quarter inch and a suitable length such as approximately one and one half inches. The primary locking key may be any length, or diameter and may be threaded or otherwise modified to correspond with optional primary locking key restraint (101) or any other primary locking key restraint design, including a single restraint restraining two or more primary locking keys simultaneously (not shown in the drawings); (1) is an interchangeable friction fitting locking key used to accomplish the primary lock of the invention, being a uniform whole locked structural building accomplished using uniform bridge key (10), (10V), (10H), or (10Q), being one of the four separate and distinct shaped uniform bridge keys of the invention locked with primary locking keys (1) inserted perpendicular to the recessed bridge key channels 7 of any number of corresponding building components (12) or (40) and the corresponding uniform bridge key side surfaces 3 simultaneously and penetrating their internal central cavities 9 and 6 and primary locking key receiving holes 19 and 2, being the primary key channel, resulting in a single bonded friction fitting finished primary lock, being uniform whole friction fitting structural buildings.

Each twenty sided cube shaped hollow uniform building component (12) (FIG. 2A); And, visible in (FIGS. 2B & 2C); (FIGS. 4A, 4B, 4C, 4D, 4E, &4F); (FIGS. 5A, 5B, 5C, 5D, 5E, &5F); (FIGS. 7, 8, 9, 10, 15, 16A, &16B) is an interchangeable uniform building component used to accomplish the primary lock of the invention, being a uniform whole locked friction fitting structural building accomplished using uniform bridge keys (10), (10V), (10H), (10Q), being one of the four separate and distinct shaped uniform bridge keys of the invention locked with primary locking keys (1) inserted perpendicular to the recessed bridge key channels 7 of a corresponding number of building components (12) or (40) and the corresponding uniform bridge key side surfaces 3 simultaneously and penetrating their internal central cavities 9 and 6 and primary locking key receiving holes 19 and 2, being the primary key channel resulting in a single bonded finished primary lock, being a uniform whole friction fitting structural building; And, uniform building component (12) is used to accomplish the corner lock, center bore hole lock, and transverse lock of the invention; And, may preferably be in the form of a twenty sided cube shaped hollow uniform building component with four identical side surfaces 14, each divided by an opening centered therebetween; And two identical top and bottom end surfaces 8. Each like side surface 14 may have a suitable length such as approximately six inches and a suitable width such as approximately six inches and a suitable thickness such as approximately one quarter inch except located between each like side surfaces 14 is a centrally disposed recessed bridge key channel 7 with an approximate recessed depth of one inch; And, each recessed bridge key channel 7 having two non-parallel opposite side surfaces 15 with a suitable length such as approximately six inches and a suitable width such as approximately one and one quarter inches and a suitable thickness such as approximately one quarter inch and having one side surface 16 centered therebetween with a suitable length such as approximately six inches and a suitable width such as approximately two and one half inches and a suitable thickness such as approximately one quarter inch containing one centered bore hole 20, being the center bore hole key channel holes for receiving center bore hole locking keys when aligned with corresponding center bore hole key channel holes and being a containment cavity for plumbing, electrical, mechanical, magnetic, solar or other improvement or enhancement elements which may be threaded, fitted, or otherwise installed or locked and being located in the center of recessed side surface 16 having a suitable diameter such as approximately two inches, being slightly less than the most narrow width of the recessed bridge key channel 7 opening in the center of each side surface 14 and two identical bore holes 19, being the primary key channel holes for receiving primary locking keys when aligned with corresponding primary key channel holes having a suitable diameter such as approximately one quarter inch and being located centered equidistant above and below centered bore hole 20 in side surface 16 and each located approximately one inch from its respective end surface 8. And, located at right angles to side surfaces 14, 15, &16 each of the end surfaces 8, may have the configuration of a twenty sided figure with suitable equal surface length and surface width such as approximately six inches when measured in a straight line from any ninety degree corner intersection of the figure to any other ninety degree corner intersection of the figure, which excludes the lengths of the recessed sides of the figure, and a suitable distance between parallel end surfaces 8 of approximately six inches, and a hollow vertical cavity extending the entire distance between parallel end surfaces 8 consisting of one centrally located internal cavity 9, being a passageway for the center bore hole key channel, transverse center bore hole key channel, any enhancement components, and having four corner cavity areas being the corner key channels for receiving corner locking keys, or five separate internal cavities 9 consisting of one separate central cavity and four separate corner cavities (not illustrated in the drawings) if the walls of component (12) are of a greater thickness, thereby closing off the corner portions of the central cavity as four separate cavities which may be pentagonal (as shown), triangular, round or any shape (not illustrated), which in such event maintain their function as corner key channels for receiving corner locking keys having identical functions as described for thinner walls of component (12).

Each twenty sided arcuate shaped hollow uniform building component describing an arc of fifteen degrees (40) (FIG. 3A); And, visible in (FIGS. 3B & 3C); (FIGS. 5A, 5B, 5C, 5D, 5E & 5F); (FIGS. 6A, 6B, 6C, 6D, 6E &6F); (FIGS. 11, 12, 13, &14) is an interchangeable uniform building component used to accomplish the primary lock of the invention, being a uniform whole locked friction fitting structural building accomplished using uniform bridge keys (10), (10V), (10H), or (10Q), being one of the four separate and distinct shaped uniform bridge keys of the invention locked with primary locking keys (1) inserted perpendicular to the recessed bridge key channels 7 of a corresponding number of building components (40) or (12) and the corresponding uniform bridge key side surfaces 3 simultaneously and penetrating their internal central cavities 9 and 6 and primary locking key receiving holes 19 and 2, being the primary key channel, resulting in a single bonded finished primary lock, being a uniform whole friction fitting structural building; And, uniform building component (40) is used to accomplish the corner lock, center bore hole lock, and transverse lock of the invention; And, may preferably be in the form of a twenty sided arc shaped hollow uniform building component describing an arc of fifteen degrees, with two identical side surfaces 14, each divided by an opening centered therebetween with each like side surface 14 offset from each other at an angle of 15 degrees and one pair of non-parallel side surfaces 17S being two rectangular figures divided by an opening therebetween and one pair of non-parallel side surfaces 17L being two rectangular figures divided by an opening therebetween; And two identical top and bottom end surfaces 11. Each like side surface 14 may have a suitable surface length such as approximately six inches and a suitable surface width such as approximately six inches and a suitable thickness such as approximately one quarter inch except located between each like side surface 14 is a centrally disposed recessed bridge key channel 7 with an approximate recessed depth of one inch; And, each recessed bridge key channel 7 having two non-parallel opposite side surfaces 15 with a suitable length such as approximately six inches and a suitable width such as approximately one and one quarter inches and a suitable thickness such as approximately one quarter inch and having one side surface 16 centered therebetween with a suitable length such as approximately six inches and a suitable width such as approximately two and one half inches and a suitable thickness such as approximately one quarter inch containing one centered bore hole 20, being the center bore hole key channel holes for receiving center bore hole locking keys when aligned with corresponding center bore hole key channel holes and being a containment cavity for plumbing, electrical, mechanical, magnetic, solar or other improvement or enhancement elements which may be threaded, fitted, or otherwise installed or locked and being located in the center of recessed side surface 16 having a suitable diameter such as approximately two inches, being slightly less than the most narrow width of the recessed bridge key channel 7 opening between each like side surface 14, and two identical bore holes 19, being the primary key channel holes for receiving primary locking keys when aligned with corresponding primary key channel holes having a suitable diameter such as approximately one quarter inch and being located centered equidistant above and below centered bore hole 20 in side surface 16 and each located approximately one inch from its respective end surface 11. And, located at right angles to side surfaces 14, 17S, & 17L each of the like end surfaces 11 may have the configuration of a twenty sided figure, with a straight line beginning at one ninety degree corner intersection (where end surface 11, side surface 14 and side surface 17S converge) of the twenty sided figure and extending in a straight line along side surface 14 a suitable length such as approximately six inches to the other ninety degree corner intersection (where end surface 11, side surface 14 and side surface 17L converge) along side surface 14 of the figure and a substantially identical straight line extending a suitable length such as approximately six inches along the opposite side surface 14 between the other two corner intersections of the figure of identical description, which straight lines represent the radii that define a minor arc with a central angle of 15 degrees, with two sides (17S) of the figure divided by a recessed channel 7S located nearest the vertex of the central angle of the minor arc described having a suitable length such as approximately five point six eight seven inches extending between the two identical corner intersections (where end surface 11, side surface 14 and side surface 17S converge) and two sides (17L) of the figure nearest the circumference of the central angle of the minor arc described having a suitable length such as approximately seven and one quarter inches extending between the two substantially identical corner intersections (where end surface 11, side surface 14 and side surface 17L converge) and said twenty sided figure having a distance between parallel end surfaces 11 such as approximately six inches and a hollow vertical cavity extending the entire distance between parallel end surfaces 11 consisting of one centrally located internal cavity 9, being a passageway for the center bore hole key channel, transverse center bore hole key channel, any enhancement components, and having four corner cavity areas being the corner key channels for receiving corner locking keys, or five separate internal cavities 9 consisting of the central cavity and four individual corner cavities (not illustrated in the drawings) if the walls of building component (40) are of a greater thickness, thereby closing off the corner portions of the central cavity as four separate cavities which may be pentagonal (as shown), triangular, round or any shape (not illustrated), which in such event maintain their function as corner key channels for receiving corner locking keys having identical functions as described for thinner walls of building component (40). Two of the side surfaces 14 of building component (40) are identical to any of the four side surfaces 14 of building component (12) and contain corresponding key channels to receive corresponding uniform bridge keys, primary locking keys, center bore hole locking keys, and corner locking keys to accomplish the primary lock, center bore hole lock, and corner lock of the invention.

Each corner locking key (50) (FIG. 15, being modified FIG. 10) is inserted rapidly on-the-fly within the mutually aligned hollow interior corner key channels (being one and the same as corner cavity portions of central cavities 9 or may be four separate corner cavities of any shape) of each twenty sided cube shaped hollow uniform building component (12) (pairs of corner key channels within four of the six cubes are represented) locking multiple twenty sided cube shaped hollow uniform building components (12) end-to-end accomplishing a lock behind the dovetail shaped recessed bridge key channels 7 of any primary lock, being the corner lock of the invention and being a separate additional lock within the entire structure and when combined with any other lock of the invention may compliment and reinforce the structure, which may extend the entire height or depth of multiple twenty sided cube shaped hollow uniform building components (12) locked end-to-end. Stated another way each adjacent pair of dovetail shaped recessed bridge key channels 7 may be locked by separate complimentary locks, one on the exterior side surfaces of the recessed bridge key channel 7 (using uniform whole bridge keys (10) in this illustration) and one within the corner key channels (being one and the same as the corner cavity portions of central cavities 9 or may be four separate corner cavities of any shape) on opposite sides of the walls of each recessed bridge key channel 7, being the corner lock of the invention. The friction fitting corner locking keys (50) may be pentagonal (shown in the drawings), triangular, round, or any shape with the corner key channels modified to correspond accordingly as long as they retain their friction fitting function and are interchangeable parts and may be rapidly unlocked, removed and reused; Corner locking keys (50) are straight pieces of any length; And, each center bore hole locking key (60) (FIG. 15, being modified FIG. 10) is inserted rapidly on-the-fly within the mutually aligned center bore hole key channels (being one and the same as the channels created by mutually aligned centered bore holes 20) of each twenty sided cube shaped hollow uniform building component (12) (one center bore hole key channel extending through three components (12) in the first tier and one center bore hole key channel extending through three components (12) in the second tier are represented) locking multiple twenty sided cube shaped hollow uniform building components (12), being the center bore hole lock of the invention and being a separate additional lock within the entire structure and when combined with any other lock of the invention may compliment and reinforce the structure. These center bore hole locking keys (60) may extend across the entire width of a structural building in either or both of two directions perpendicular to each other. They may be straight pieces any length able to lock at least two separate building components (A shorter center bore hole locking key (60) with both ends threaded and corresponding threaded optional center bore hole locking key restraint (61A) is illustrated). The outside diameter of (60) must be only slightly smaller than the corresponding center bore hole size. The center bore hole locking keys (60) are always perpendicular to the locked recessed bridge key channels 7 throughout the structure and pass through them beneath or above any uniform bridge key. The center bore hole locking keys (60) are always perpendicular to any corner cavity locking keys (50) throughout the structure and pass beside or between them; Therefore, the primary locked uniform whole bridge key (10) may be surrounded by corner locking keys and center bore hole locking keys perpendicular to each other and evenly spaced throughout the structure, being a triple locked structure. The friction fitting center bore hole locking keys (60) are interchangeable parts and may be rapidly unlocked, removed and reused. The center bore hole locking key (60) may be any length and may be threaded or otherwise modified to correspond with optional threaded center bore hole locking key restraint (61A). The design of locking key restraint (61A) may be any shape or design as long as it functions as a restraint, including a single restraint restraining two or more center bore hole locking keys simultaneously (not shown in the drawings).

(FIG. 16A) illustrates the components of the transverse lock in exploded view. One uniform transverse bridge key (21) and two center bore hole locking keys (60) are rapidly friction fitted on-the-fly in a two part procedure to lock the end surface of one cube (12) to the side surface of another cube (12) or vise versa. This enables a rapid change of orientation of the locked components while remaining flush with the existing locked structure. This provides an advantage of more flexible structural design choices. The manufactured cube shaped uniform hollow building component (12) is configured to lock together with identical cubes (12) using one separate and distinct shaped uniform transverse bridge key (21) in addition to the four separate and distinct shaped uniform bridge keys used to accomplish the primary lock previously described. One uniform transverse bridge key (21), two center bore hole locking keys (60), two cubes (12) (or one cube and one other building component with identical side surfaces not illustrated), and two locking procedures are required to achieve the transverse lock of the invention. Any end surface of one cube (12) may be locked to any side surface of another cube (12) or any side surface of one cube (12) may be locked to any end surface of another cube (12), being the transverse alignment orientations. The transverse lock is accomplished using the uniform transverse bridge key (21) friction fitted into the end of one cube (12) within internal central cavity 9 in either of two directions at right angles to each other (one demonstrated in the illustration) having two parallel sides surfaces 25 with four center bore holes 24, two of which mutually align with the two center bore holes 20 of the cube shaped uniform hollow building component (12) below, being the center bore hole key channel (one and the same as central internal cavity 9 and the channel created through it by mutually aligned pairs of centered bore holes 20 of cube (12)), which is friction fitted with one corresponding center bore hole locking key (60) achieving the first locking procedure of the transverse lock, followed by friction fitting any of the four recessed bridge key channels of another cube (12) over side surface 26 of the protruding portion of the transverse bridge key (21) until mutual alignment of their adjacent pairs of center bore holes 20 and 24 is accomplished, being the transverse center bore hole key channel (which is the key channel beginning above the dovetail shaped recessed bridge key channel and center bore hole 20 of cube (12) and extending vertically down through side surface 16 and through mutually aligned center bore holes 20 and 24 through side surface 26 and into the central cavity 9 of cube (12)), which is friction fitted with a second corresponding center bore hole locking key (60) as the second and final locking procedure of the transverse lock, achieving the finished locked uniform friction fitting structural building, being the transverse lock of the invention able to sustain itself independent of additional materials and processes. The two processes are reversed to accomplish each transverse lock in reverse order. In other words the transverse bridge key may be locked to the adjacent side face of one component through the transverse center bore hole key channel first and then into the end of a transverse oriented cube through the center bore hole key channel second accomplishing the transverse lock. The center bore hole locking key (60) may be any length and may be threaded or otherwise modified to correspond with optional threaded center bore hole locking key restraint (61B) as long as it retains it's friction fitting lock function. The design of locking key restraint (61B) may be any shape or design as long as it functions as a restraint, including a single restraint restraining two or more center bore hole locking keys simultaneously (not shown in the drawings); (FIG. 16A) also illustrates four cubes (12) locked to form a corner without the need for separate corner components. FIG. 16B illustrates one uniform transverse bridge key (21), two center bore hole locking keys (60), one fitted horizontally through mutually aligned holes 20 and 24 of one lower cube, being the center bore hole key channel and one fitted vertically through mutually aligned holes 20 and 24 of one transverse aligned upper cube, being the transverse center bore hole key channel, and one additional cube shaped hollow uniform building components (12). One cube component (12) is locked in transverse alignment on top of and perpendicular to the uppermost of the two cube components (12) below it, being the transverse lock of the invention. The two procedure transverse locking process was previously described herein. The illustrated lock does not use optional center bore hole locking key restraint (61A) or (61B) and corresponding threaded center bore hole locking key (60).

The primary lock and main object of the invention, being a uniform whole friction fitting primary locked structural building, being a flush uniform whole beam structural building, is accomplished locking two cube shaped hollow uniform building components (12) (FIGS. 4E & 4F), or two arc shaped hollow uniform building components describing an arc of fifteen degrees (40) (FIGS. 6E, &6F), or one cube shaped hollow uniform building component (12) & one arcuate shaped hollow uniform building component describing an arc of fifteen degrees (40) (FIGS. 5E, &5F) in adjacent, flush, opposed in mirror image to each other, like side surface to like side surface alignment orientation, being a flush uniform primary lock having no additional building components stacked on top abutting end-to-end using two uniform horizontal half bridge keys (10H) and four cylinder shaped primary locking keys (1) may be accomplished in seven steps:

1. placing and holding by hand two cube shaped hollow uniform building components (12), or two arcuate shaped hollow uniform building components describing an arc of fifteen degrees (40), or one cube shaped hollow uniform building component (12) and one arcuate shaped hollow uniform building component describing an arc of fifteen degrees (40) in adjacent like side surface to like side surface alignment orientation with flush end surfaces, and 2. friction fitting by hand one uniform horizontal half bridge key (10H) through the adjacent recessed bridge key channels 7 (not visible in the drawings with bridge key in place) of both hollow uniform building components (12) or (40) or (12) and (40) until primary locking key receiving holes 19 and 2 of the corresponding components are in mutual alignment, being the primary key channel through internal central cavities 9 and 6, and 3. friction fitting with a hand tool if needed, a cylinder shaped primary locking key (1) horizontally through internal central cavity 9 of one component (12) or (40), primary locking key receiving holes 19 and 2, and into internal central cavity 6, being it's primary locked position within the primary key channel, and 4. friction fitting with a hand tool if needed, a second cylinder shaped primary locking key (1) horizontally through internal central cavity 9 of the adjacent component (12) or (40), primary locking key receiving holes 19 and 2, and into internal central cavity 6, being it's primary locked position within the primary key channel, and 5. friction fitting by hand one uniform horizontal half bridge key (10H) through the opposite end of the primary locked adjacent recessed bridge key channels 7 of both shaped hollow lock components (12) or (40), and 6. repeating step 3. for the second horizontal half bridge key (10H), and 7. repeating step 4. for the second horizontal half bridge key (10H).

The primary lock and main object of the invention, being a uniform whole friction fitting primary locked structural building, being a flush uniform whole beam structural building, is accomplished locking three or more cube shaped hollow uniform building components (12) (FIG. 8), or three or more arcuate shaped hollow uniform building components describing an arc of fifteen degrees (40) (FIG. 12), or three or more cube shaped hollow uniform building components (12) & arcuate shaped hollow uniform building components describing an arc of fifteen degrees (40) (Not shown in drawings) in adjacent, flush, opposed in mirror image to each other, like side surface to like side surface alignment orientation, in the flush uniform bridge key primary locked position having no additional building components stacked on top abutting end-to-end using a corresponding number of uniform horizontal half bridge keys (10H) and a corresponding number of primary locking keys (1) may be accomplished by repetition of the seven steps previously described to achieve a uniform whole primary locked building member, being a flush uniform whole beam structural building, which are repeated using additional steps for each corresponding component added to the primary locked flush beam; Or, if the longer length primary locking key (1) is used passing through all four corresponding side surfaces and the internal cavities of both building components and uniform horizontal bridge key (10H), through the primary key channel the previously described steps would be modified accordingly to account for the longer length primary locking key used; And, if any primary locking key restraint of any shape or design is used to enhance the primary lock, additional steps and modifications would be required as needed to accomplish the restraint.

The primary lock and main object of the invention, being a uniform whole friction fitting primary locked structural building, being the beginning tier of a wall, is accomplished locking two cube shaped hollow uniform building components (12) (FIGS. 4C &4D), or two arcuate shaped hollow uniform building components describing an arc of fifteen degrees (40) (FIGS. 6C & 6D), or one cube shaped hollow uniform building component (12) & one arcuate shaped hollow uniform building component describing an arc of fifteen degrees (40) (FIGS. 5C & 5D) in adjacent, flush, opposed in mirror image to each other, like side surface to like side surface alignment orientation, in the protruding uniform bridge key primary lock position locked to accept additional building components stacked on top abutting end-to-end using one uniform whole bridge key (10) and two cylinder shaped primary locking keys (1) may be accomplished in four (4) steps:

1. placing and holding by hand two cube shaped hollow uniform building components (12), or two arcuate shaped hollow uniform building components describing an arc of fifteen degrees (40), or one cube shaped hollow uniform building component (12) and one arcuate shaped hollow uniform building component describing an arc of fifteen degrees (40) in the adjacent opposed in mirror image to each other, in flush like side surface to like side surface alignment orientation, with flush end faces, and 2. friction fitting by hand one uniform whole bridge key (10) through the adjacent recessed bridge key channels 7 (not visible in the drawings with bridge key in place) of both hollow uniform building components (12) or (40) or (12) and (40) until the upper two primary locking key receiving holes 19 of the corresponding building components and the lower two primary locking key receiving holes 2 of the uniform whole bridge key are in mutual alignment, being the primary key channel through internal central cavities 9 and 6, and 3. friction fitting with a hand tool if needed, a cylinder shaped primary locking key (1) horizontally through internal central cavity 9 of one component (12) or (40), primary locking key receiving holes 19 and 2, and into internal central cavity 6, being it's primary locked position within the primary key channel, and 4. friction fitting with a hand tool if needed, a second cylinder shaped primary locking key (1) horizontally through internal central cavity 9 of the adjacent component (12) or (40), primary locking key receiving holes 19 and 2, and into internal central cavity 6, being it's primary locked position within the primary key channel.

Not shown in FIGS. 4C &4D, 5C & 5D, or 6C & 6D, adjacent cube shaped hollow uniform building component (12), or arcuate shaped hollow uniform building component describing an arc of fifteen degrees (40), or cube shaped hollow uniform building component (12) & arcuate shaped hollow uniform building component describing an arc of fifteen degrees (40) represent the first tier of a primary locked building member and the opposite end of the adjacent recessed key channels 7 of two adjacent shaped hollow uniform building components may contain a uniform horizontal half bridge key (10H) and may be locked using the steps previously described for the adjacent, flush, opposed in mirror image to each other, like side surface to like side surface alignment orientation, in the flush uniform bridge key primary lock position.

The primary lock and main object of the invention, being a uniform whole friction fitting primary locked structural building, being the beginning two tiers of a wall may be accomplished locking more than one tier and at least four cube shaped hollow uniform building components (12) (six shown in the drawing) (FIG. 10), or more than one tier and at least four arc shaped hollow uniform building components describing an arc of fifteen degrees (40) (six shown in the drawing) (FIGS. 14), combining the adjacent, flush, opposed in mirror image to each other, like side surface to like side surface alignment orientation and abutting, flush, stacked, opposed in mirror image to each other, in like end surface to like end surface alignment orientation, in the protruding uniform bridge key primary lock position having additional building components locked and stacked on top abutting end-to-end using a corresponding number of uniform whole bridge keys (10) and a corresponding number of primary locking keys (1) and each consecutive tier of the wall involves stacking in like side surface to like side surface and, like end surface to like end surface, opposed to each other in mirror image alignment friction fit over the protruding upper horizontal half of whole bridge key (10) each additional substantially identical components of the next tier and repeating previously described steps for building the beginning tier of a wall and adding additional steps using additional uniform building components, uniform whole bridge keys, and primary locking keys as needed to accommodate each consecutive tier of the wall and modifying the process as needed. If additional components (12) or (40) or (12) and (40) (not shown in the drawings) are added to the side of an existing wall the locking process is modified accordingly using the components previously described. Other corresponding uniform bridge keys and locking keys may be locked into the wall as needed.

The primary lock and main object of the invention, being a uniform whole friction fitting primary locked structural building, being a flush post or building member having a flush post, is accomplished locking two or more cube shaped hollow uniform building components (12) (FIGS. 7 & 9), or two or more arcuate shaped hollow uniform building components describing an arc of fifteen degrees (40) (FIGS. 11 & 13) abutting, flush, stacked, opposed in mirror image to each other, in like end surface to like end surface alignment orientation, using two uniform vertical half bridge keys (10V) and four primary locking keys (1) for each additional tier may be accomplished in six steps:

1. friction fitting by hand one uniform vertical half bridge key (10V) through the recessed bridge key channel 7 on one side of one hollow uniform building component (12) or (40) until the upper primary locking key receiving hole 19 of component (12) or (40) and the lower primary locking key receiving hole 2 of (10V) are in mutual alignment, being the primary key channel through recessed cavity 6 and internal central cavity 9, and 2. friction fitting with a hand tool if needed, a cylinder shaped primary locking key (1) horizontally through recessed cavity 6, primary locking key receiving holes 2 and 19, and into internal central cavity 9, being it's primary locked position within the primary key channel resulting in the upper half of component (10V) protruding above the flush end surface of component (12) or (40), and 3. repeating step 1. and step 2. described above in the two previous paragraphs on the opposite side of the same hollow uniform building component (12) or (40) resulting in the upper halves of two uniform vertical half bridge keys (10V) protruding above the flush end surface of component (12) or (40), and 4. friction fitting by hand another corresponding hollow uniform building component (12) or (40) over the two protruding upper halves of the two primary locked components (10V), and 5. friction fitting with a hand tool if needed, a cylinder shaped primary locking key (1) horizontally through recessed cavity 6 of the upper protruding half of one component (10V) and it's primary locking key receiving hole 2 and passing through primary locking key receiving hole 19 and into internal central cavity 9 of corresponding building/lock component (12) or (40), being it's primary locked position within the primary key channel, and 6. repeating step 5. described in the previous paragraph on the recessed bridge key channel 7 on the opposite side of the same corresponding shaped hollow building component (12) or (40).

The primary lock and main object of the invention, being a uniform whole friction fitting locked structural building, being a flush interior corner frame structural building, is accomplished locking three cube shaped hollow uniform building components (12) (FIG. 9), or three arcuate shaped hollow uniform building components describing an arc of fifteen degrees (40) (FIG. 13) by first locking two components in adjacent, flush, opposed in mirror image to each other, like side surface to like side surface alignment orientation followed by a third component locked in abutting, flush, stacked, opposed in mirror image to each other, in like end surface to like end surface alignment orientation, having the recessed bridge key channels 7 of all three shaped hollow uniform building components intersect and mutually align using one uniform three quarters bridge key (10Q) and three primary locking keys (1) may be accomplished in six steps:

1. placing and holding by hand two cube shaped hollow uniform building components (12), or two arcuate shaped hollow uniform building components describing an arc of fifteen degrees (40), in side-to-side mirror image mutual alignment orientation, and 2. friction fitting by hand one uniform three quarters bridge key (10Q) through the adjacent recessed bridge key channels 7 (not visible in the drawings with bridge key in place) of both hollow uniform building components (12) or (40) until the lower primary locking key receiving holes 2 of component (10Q) and the upper primary locking key receiving holes 19 of the corresponding component (12) or (40) are in mutual alignment, being the primary key channel through internal central cavities 9 and 6, and 3. friction fitting with a hand tool if needed, a cylinder shaped primary locking key (1) horizontally through the mutually aligned internal central cavity 9, primary locking key receiving holes 19 and 2, and internal central cavity 6, being the primary key channel through the adjacent components (12) or (40) and lower portion of uniform three quarters bridge key (10Q) with the upper portion of uniform three quarters bridge (10Q) protruding above the flush surfaces of hollow uniform building component (12) or (40), and 4. friction fitting with a hand tool if needed, a second cylinder shaped primary locking key (1) horizontally through the other side of aligned internal central cavity 9, primary locking key receiving holes 19 and 2, and internal central cavity 6, being the primary key channel accomplishing a primary lock of adjacent components (12 or (40) with the upper portion of uniform three quarters bridge (10Q) protruding above the flush surfaces of hollow uniform building component (12) or (40), and 5. friction fitting by hand a third cube shaped hollow uniform building component (12), or a third arcuate shaped hollow uniform building component describing an arc of fifteen degrees (40), in stacked, flush, like end surface to like end surface alignment orientation over the protruding portion of the uniform three quarters bridge key (10Q) locked with two components below, and 6. friction fitting with a hand tool if needed, a cylinder shaped primary locking key (1) horizontally through the mutually aligned primary key channel, being mutually aligned recessed cavity 6, primary locking key receiving hole 2 in the remaining protruding upper portion of uniform three quarters bridge key (10Q) and primary locking key receiving hole 19 and internal central cavity 9 of the corresponding friction fitted third shaped hollow uniform building component (12) or (40), which finishes the primary locked structural building; The steps of this lock may be reversed by locking the end-to-end components first and the side-to-side component last; Additional components (12) or (40) may be locked to the structure by repeating the steps previously described as required.

Using longer length primary locking keys would require modification of the number of steps to accomplish any primary lock of the invention; Using optional primary locking key restraint (101) and/or any shape or design of restraint after completion of any primary lock of the invention to enhance the locked components requires additional steps and modifications to accomplish each restraint used.

In addition to the procedures described in the previous paragraphs herein for accomplishing the primary lock of this invention in it's various embodiments, the corner lock, center bore hole lock, and transverse lock of the invention may be accomplished as follows:

Corner lock: (FIG. 15) Each corner cavity locking key (50) (Illustrated as pentagonal shaped) is friction fitted from the exterior of the shaped hollow uniform building components (12) or (40) from above or below and pass within the corner key channels, being the corner areas of centrally located internal cavities 9 of two or more twenty sided shaped hollow uniform building components (12) or (40) primary locked in stacked, flush, like end surface to like end surface alignment orientation, being the separate and distinct corner lock of this invention. This step may be repeated over and over again throughout the structure as determined by the builder accomplishing evenly spaced corner locks that compliment and reinforce the primary locks. Corner locking key (50) may extend through multiple components to a length determined by the builder and may be rapidly unlocked by removal; Additional steps and modifications would be required and may be used for any optional corner locking key restraint (Not illustrated in the drawings) of any shape or design used to restrain the corner locking key and enhance the corner lock.

Center bore hole lock: (FIG. 15) Each cylinder shaped center bore hole locking key (60) is friction fitted passing through the center bore holes 20 and centrally located internal cavities 9 of two or more twenty sided shaped hollow uniform building components (12) or (40) primary locked in the adjacent opposed in mirror image to each other, in flush like side surface to like side surface alignment orientation, being the separate and distinct center bore hole lock of this invention. This step may be repeated over and over again throughout the structure as determined by the builder accomplishing evenly spaced center bore hole locks that compliment and reinforce the primary locks. Center bore hole locking key (60) may extend through multiple components to a length determined by the builder and may be rapidly unlocked by removal. Additional steps and modifications would be required and may be used for any optional center bore hole locking key restraint (61) and/or other shape or design of restraint designated and used to restrain the center bore hole locking key and enhance the center bore hole lock.

Transverse lock: (FIGS. 16A & 16B) Uniform transverse bridge key (21) is friction fitted into the end of internal central cavity 9 of one cube shaped hollow uniform building component (12) in either of two directions at right angles to each other (one demonstrated in the illustration) until it's two parallel side surfaces 25 having two center bore holes 24, being transverse locking key receiving holes, align with the two center bore holes 20 of the corresponding cube shaped uniform hollow building component (12), being the horizontal transverse key channel (one and the same as central internal cavity 9 and the channel created through it by mutually aligned pairs of center bore holes 20 of cube (12)), then friction fitting one corresponding center bore hole locking key (60) through the center bore hole key channel achieving the first lock of the two procedure locking process, then one recessed side surface 16 of the bridge key channel of another cube (12) is friction fitted over side surface 26 of the protruding portion of the transverse bridge key (21) until alignment of their adjacent pairs of center bore holes 20 and 24 is accomplished, being the transverse center bore hole key channel (which is the key channel cavity beginning above the dovetail shaped recessed bridge key channel and center bore hole 20 of the uppermost cube (12) and extending vertically through side surface 16 and through aligned center bore holes 20 and 24 through side surface 26 and into the internal central cavity 9 of lower cube (12)), finally a second corresponding center bore hole locking key (60) is friction fitted through the transverse center bore hole key channel, achieving the finished locked structural building, being the transverse key lock of the invention. Additional steps and modifications would be required and may be used for any optional center bore hole locking key restraint (61) and/or other shape or design of restraint used to restrain the transverse locking key and enhance the transverse lock.

The primary lock, corner lock, center bore hole lock, and transverse lock of the invention may be accomplished using the steps and procedures previously described herein; However, the builder is not restricted to the steps and procedures previously described for accomplishing the various locks of the invention which may be accomplished in a variety of other ways using the same interchangeable parts which result in the same or similar locks described and may vary according to the discretion of the builder; For instance, one procedural building method which varies from those previously described is as follows: The builder may lock together a footprint consisting of any number of building components and friction fitting locking keys resulting in a first tier of primary locked components of any shape which may contain other building components, locking keys, and optional restraints, then additional tiers of building components, friction fitting locking keys and optional restraints may be added and locked stacked on top of and within the structure at the discretion of the builder. These locks may be unlocked and re-locked as desired. Also, the builder may elect to rearrange the steps previously described and lock a uniform bridge key to a single component with a primary locking key not in alignment with another building component and then add the next adjacent building component in the adjacent opposed in mirror image to each other, in flush like side surface to like side surface alignment orientation with the other side of the bridge key and friction fit the next primary locking key, achieving the same lock by an alternate process.

Another embodiment of the locked corresponding building components, friction fitting locking keys, and locking key restraints to lock and build uniform whole friction fitting locked structural buildings deploys an alternate process of locking components and is achieved by first aligning two building components adjacent side surface to side surface and inserting the first center bore hole locking key having threaded ends within the center bore hole key channel of the adjacent components and locking them together with threaded center bore hole locking key threaded restraints deployed within the internal central cavity of each adjacent component with the threaded restraints being larger than the center bore hole size and tightening over the threaded ends of the center bore hole locking key against the interior side surface of each adjacent bridge key channel with the remaining threaded ends protruding into each respective internal central cavity of the adjacent components, resulting in the two adjacent components being able to twist around the center bore hole locking key like side surface to like side surface until their corresponding bridge key channels are twisted to alignment and a uniform whole bridge key is inserted into the corresponding aligned bridge key channels with the bottom half of the uniform whole bridge key resting on top of the center bore hole key joined below it with the top half of the uniform bridge key protruding above the flush surfaces of the first tier building components achieving a center bore hole locking key and uniform whole bridge key combination lock and locking the adjacent first tier building components and repeating this process for any number of first tier building components followed by friction fitting the next tier of components over the protruding top halves of the corresponding uniform bridge keys followed by inserting more threaded center bore hole locking keys and threaded center bore hole locking key restraints as previously described and repeating these processes for each new additional tier desired by the builder. The primary locking key of the invention is not required in this process although it may be used in the process as needed with or without a primary locking key restraint at the option of the builder. The corner locking key of the invention is not required in this process although it may be used in the process as needed with or without a corner locking key restraint at the option of the builder. The process described may be altered at the discretion of the builder as long as it accomplishes the same resulting combined locked components. For instance, a center bore hole locking key may be inserted through the center bore hole key channel of one building component and a threaded restraint may be applied within the internal central cavity of the first building component resulting in a protruding center bore hole locking key which is then friction fitted with the second building component through it's corresponding center bore hole key channel, which is then restrained with another center bore hole locking key restraint and this method of adding the next adjacent component in the tier may continue using the same process. The uniform whole bridge keys would be inserted as needed followed by the next tier of components. Any design or method of restraint may be used in the processes previously described to restrain any of the locking keys rather than threaded corresponding components described as long as the friction fitting locking keys retain their friction fitting function or the restraints may be eliminated if not needed for a particular locked structural application.

It should be understood that due to the nature of the manufacturing machinery, equipment, and tooling needed to produce the building components and friction fitting locking keys of this invention, the actual parts themselves when manufactured may have rounded corners and rounded intersecting side surfaces rather than the sharp angular corners and sharp angular intersecting side surfaces depicted in the figure drawings of this invention; However, there function and utility is identical to that claimed and described and is within the scope of this invention.

It should be understood, however, that while metal, metal alloy, polymer or polymer composite, wood or cement composite are expressly written, the invention is not limited to any particular material, thickness of material, weight of material, any characteristic of material, or structural design of material, but may be made from any natural and/or synthetic material, materials or combination of materials capable of being manufactured with close enough tolerances to achieve uniformity of size among corresponding components of the same size in order to accomplish interchangeability of each of the individual building/lock components of corresponding size: And, the invention is not limited to any size of the manufactured components as long as they correspond with each other, including miniature sizes for modeling, entertainment or other purposes and very large size components if desired.

Any of the four locks described herein may be combined and used in any combination together with or independent of the primary lock to accomplish uniform whole friction fitting locked building structures with or without the use of locking key restraints.

Although the disclosure hereof is detailed and exact to enable those skilled in the art to practice the invention, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention. The invention, therefore, is not to be restricted except in the spirit and scope of the invention as defined in the claims appended hereto.

The invention claimed is:

1. A rapidly locked uniform whole friction fitting structural building, comprising:
    a plurality of shaped hollow uniform building components; each of the plurality of building components having a distinct geometric shape, including a distinct cube shape and a distinct arcuate shape; each of the plurality of building components having two opposing side surfaces, two opposing end surfaces, and four corner cavities, and, each of the two side surfaces and end surfaces including a centered recess formed from a dovetail groove consisting of a pair of non-parallel recessed side surfaces joined to a bottom surface, said bottom surface of the centered recess formed with a pair of bore holes defining primary locking key holes located along a vertical centerline of the centered recess, said pair of bore holes being located an equal distance from a top and a bottom of corresponding end surface or side surface, said bottom surface further including a large bore hole centered between said primary locking key holes defining a center bore hole,
    said structural building further comprising a plurality of friction fitting locking keys configured to be inserted between adjacent building components so to assemble adjacent building components, said plurality of friction fitting locking keys including a plurality of uniform whole bridge keys, a plurality of uniform vertical half bridge keys, a plurality of uniform horizontal half bridge keys, a plurality of uniform three quarters bridge keys, a plurality of primary locking keys, a plurality of center bore hole locking keys, and a plurality of corner locking keys,
    each of said plurality of uniform whole bridge keys consisting of a hollow central cavity enclosed by six side surfaces, two of the six side surfaces of each whole bridge key being parallel side surfaces, said parallel side surfaces having two bore holes formed therein along a vertical centerline, said two bore holes located an equal distance from the top and bottom of each of the parallel side surfaces, each of said uniform whole bridge keys having a shape corresponding to the shape of the centered recess of one of the side surfaces or end surfaces of one of the uniform building components in face to face relation with the centered recess of one of the side surfaces or end surfaces of an adjacent one of the uniform building components forming a bridge key channel, said plurality of uniform building components in said structural building forming a plurality of bridge key channels; said plurality of bridge key channels configured for insertion of one of the plurality of uniform whole bridge keys so to assemble adjacent ones of the plurality of uniform building components, wherein said two bore holes of the parallel side surfaces are aligned with said primary locking key holes of said corresponding uniform building component and are configured for insertion of said plurality of primary locking keys, each of said plurality of uniform vertical half bridge keys consisting of a vertical half of one of said plurality of uniform whole bridge keys, each of said a plurality of uniform horizontal half bridge keys consisting of a horizontal half of one of said plurality of uniform whole bridge keys, each of said plurality of uniform three quarters bridge keys consisting of a three quarter portion of one of said plurality of uniform whole bridge keys, wherein each of the plurality of friction fitting locking keys engaging one or more of a plurality of friction fitting locks alone or in combination, said plurality of friction fitting locks comprising said plurality of bridge key channels, a plurality of primary key channels formed upon alignment of one of said plurality of primary locking key holes with one of said two bore holes in said plurality of bridge keys, a plurality of center bore hole key channels formed upon alignment of one of said center bore holes of said side surfaces of adjacent ones of said plurality of uniform building components, and a plurality of corner key channels formed upon alignment of one of said corner cavities of one of said plurality of building components with one of said corner cavities of an adjacent one of said plurality of uniform building components when said adjacent building components are stacked end to end, and wherein said plurality of uniform building components are aligned adjacent one another or stacked adjacently upon one another in a vertical alignment, and wherein one of said plurality of uniform whole bridge keys, said plurality of horizontal half bridge keys, said plurality of vertical half bridge keys, and said plurality of three quarters bridge keys are friction fit in said shared bridge key channels of adjacent uniform building components, and wherein said two bore holes of said plurality of bridge keys are aligned with one of said primary locking key holes of two of the said adjacent uniform building components and two of said plurality of primary locking keys are inserted therein;

wherein one of said plurality of center bore hole locking keys is friction fit into the center bore hole key channel between adjacent uniform building components in face to face alignment of one of said side or ends surfaces;

wherein one of said plurality of corner locking keys is friction fit into said corner key channel between adjacent uniform building components in vertical alignment;

wherein said plurality of uniform building components, said plurality of friction fitting locking keys, and said plurality of friction fitting locks for a friction fitted connection and enable said structural building to be rapidly erected and locked in the assembled configuration.

2. The rapidly locked uniform whole friction fitting structural building of claim 1, wherein the plurality of uniform building components have exclusively said distinct cube shape forming the structural building having an exclusively squared configuration.

3. The rapidly locked uniform whole friction fitting structural building of claim 2, wherein said plurality of uniform building components having said distinct cube shape are formed such that each of the two side surfaces and the two end surfaces are formed with the same configuration and wherein said plurality of uniform building components are capable of locking with each other on each of the two side surfaces and two end surfaces or on the two side surfaces and the two end surfaces simultaneously in a plurality of right angles eliminating the requirement for a different separate corner building component; and, said plurality of uniform building components are locked to each other through one of the two side surfaces and two end surfaces when in side by side configuration and are capable of being locked to each other through the two side surfaces and the two end surfaces when stacked in vertical alignment.

4. The rapidly locked uniform whole friction fitting structural building of claim 1, wherein the plurality of uniform building components have exclusively said arcuate shape forming the structural building, wherein said structural building is formed exclusively of portions formed with an arc of fifteen degrees.

5. The rapidly locked uniform whole friction fitting structural building of claim 1, wherein said structural building has a squared configuration combined portions formed with an arc of fifteen degrees.

6. The rapidly locked uniform whole friction fitting structural building of claim 1, wherein said uniform building components and said plurality of friction fitted locking keys are manufactured from a material selected from the group consisting of metal, metal alloy, polymer, polymer composite, wood, wood composite, cement, and cement composite.

7. The rapidly locked uniform whole friction fitting structural building of claim 1, wherein said structural building does not require additional materials or processes to form said friction fitting connection between adjacent ones of said plurality of uniform building components.

8. The rapidly locked uniform whole friction fitting structural building of claim 1, wherein, said friction fitted connection can be rapidly unlocked, removed, and locked to a like side surface or like end surface of another building component, rapidly modifying the configuration of the structural building.

9. The rapidly locked uniform whole friction fitting structural building of claim 1, further comprising a plurality of enhancement building components having a distinct geometric shape configured to be attached to an interior and an exterior of the structural building; and, further including a transverse locking key and a plurality of locking key restraints.

10. The rapidly locked uniform whole friction fitting structural building of claim 1, wherein, said plurality of friction fitting locks are used for the additional purpose of installing a plurality of improvement components, including plumbing, electrical, and mechanical components.

\* \* \* \* \*